US008888004B2

(12) United States Patent
Setlak et al.

(10) Patent No.: US 8,888,004 B2
(45) Date of Patent: Nov. 18, 2014

(54) FINGER SENSING DEVICE INCLUDING DIFFERENTIAL MEASUREMENT CIRCUITRY AND RELATED METHODS

(75) Inventors: Dale R. Setlak, Melbourne, FL (US);
Patrick J. Landy, Melbourne, FL (US);
Albert M. Straub, Indialantic, FL (US);
Roger Lee Schenk, Indialantic, FL (US)

(73) Assignee: Authentec, Inc., Melbourne, FL (US)

( * ) Notice: Subject to any disclaimer, the term of this patent is extended or adjusted under 35 U.S.C. 154(b) by 409 days.

(21) Appl. No.: 13/269,316

(22) Filed: Oct. 7, 2011

(65) Prior Publication Data
US 2012/0085822 A1 Apr. 12, 2012

Related U.S. Application Data

(60) Provisional application No. 61/391,327, filed on Oct. 8, 2010.

(51) Int. Cl.
| G06K 7/08 | (2006.01) |
| G06K 9/60 | (2006.01) |
| G06K 9/00 | (2006.01) |

(52) U.S. Cl.
CPC .............. *G06K 9/0002* (2013.01); *G06K 9/605* (2013.01)
USPC ............................. 235/439; 345/175; 324/658

(58) Field of Classification Search
USPC .............................. 235/439; 345/175; 324/658
See application file for complete search history.

(56) References Cited

U.S. PATENT DOCUMENTS

| 5,325,442 | A | 6/1994 | Knapp ............................... 382/4 |
| 5,828,773 | A | 10/1998 | Setlak et al. ................... 382/126 |
| 5,940,526 | A | 8/1999 | Setlak et al. ................... 382/124 |
| 6,067,368 | A | 5/2000 | Setlak et al. ................... 382/124 |
| 6,198,089 | B1 | 3/2001 | Shi |
| 6,429,666 | B1 * | 8/2002 | Um ............................... 324/693 |
| 6,512,381 | B2 | 1/2003 | Kramer |
| 6,597,289 | B2 | 7/2003 | Sabatini ......................... 340/635 |
| 7,071,629 | B2 | 7/2006 | Russ et al. ................... 315/169.3 |
| 7,076,089 | B2 | 7/2006 | Brandt et al. |
| 7,102,364 | B2 | 9/2006 | Umeda et al. |
| 7,397,096 | B2 | 7/2008 | Chou et al. |
| 7,460,697 | B2 | 12/2008 | Erhart et al. ................... 382/124 |
| 7,492,361 | B2 | 2/2009 | Kawachi et al. ............... 345/204 |
| 7,719,074 | B2 | 5/2010 | Buer ............................. 257/444 |
| 7,751,601 | B2 | 7/2010 | Benkley, III .................. 382/124 |
| 2001/0025532 | A1 | 10/2001 | Kramer ....................... 73/862.68 |
| 2004/0233374 | A1 | 11/2004 | Yamazaki et al. ............. 349/153 |

(Continued)

FOREIGN PATENT DOCUMENTS

| EP | 2148302 | 1/2010 |
| EP | 2336805 | 6/2011 |

(Continued)

*Primary Examiner* — Allyson Trail
(74) *Attorney, Agent, or Firm* — Allen, Dyer, Doppelt, Milbrath & Gilchrist, P.A.

(57) ABSTRACT

A finger sensing device may include an array of finger sensing pixels to receive a user's finger adjacent thereto. Each finger sensing pixel may include a finger sensing electrode. The finger sensing device may include a finger drive electrode configured to couple a drive signal through the user's finger to the array of finger sensing pixels. The finger sensing device may also include differential pixel measurement circuitry coupled to the array of finger sensing pixels and configured to generate a plurality of interpixel difference measurements for adjacent pairs of the finger sensing pixels.

23 Claims, 28 Drawing Sheets

(56) References Cited

U.S. PATENT DOCUMENTS

| | | | |
|---|---|---|---|
| 2005/0110103 A1 | 5/2005 | Setlak | 257/414 |
| 2005/0213799 A1 | 9/2005 | Sawano | 382/124 |
| 2008/0267462 A1 | 10/2008 | Nelson et al. | 382/124 |
| 2008/0278459 A1* | 11/2008 | Yamashita | 345/175 |
| 2009/0123039 A1 | 5/2009 | Gozzini | 382/124 |
| 2009/0257626 A1* | 10/2009 | Sherlock et al. | 382/126 |
| 2010/0315337 A1* | 12/2010 | Ferren et al. | 345/158 |
| 2011/0176037 A1* | 7/2011 | Benkley, III | 348/294 |

FOREIGN PATENT DOCUMENTS

| | | |
|---|---|---|
| JP | H11118415 | 4/1999 |
| JP | 2011175452 | 9/2011 |
| TW | I233060 | 5/2005 |
| TW | I310521 | 6/2009 |
| WO | 2004049942 | 6/2004 |
| WO | 2007011607 | 1/2007 |

\* cited by examiner

FINGER SENSING DEVICE INCLUDING DIFFERENTIAL MEASUREMENT CIRCUITRY AND RELATED METHODS

RELATED APPLICATION

The present application is based upon previously filed copending provisional application Ser. No. 61/391,327, filed Oct. 8, 2010, the entire subject matter of which is incorporated by reference in its entirety.

FIELD OF THE INVENTION

The present invention relates to the field of electronics, and, more particularly, to finger sensing devices and related methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

In recent years it has been practical and economical to build high-quality electronic fingerprint sensing devices using radio-frequency (RF) electric fields to develop an electronic representation of the fingerprint pattern. Such devices have been fabricated as standard CMOS integrated circuits on monocrystalline silicon substrates. These processes allow the electronic structures necessary to read the signal from each of the sensor's pixels or sensing electrodes to be fabricated directly beneath the pixels. Locating the signal conditioning electronics or sense amps under pixel was important to adequate performance of the circuitry.

One such RF fingerprint sensing device is disclosed in U.S. Pat. No. 5,940,526 to Setlak et al. and assigned to the assignee of the present invention. The patent discloses an integrated circuit fingerprint sensor including an array of RF sensing electrodes to provide an accurate image of the fingerprint friction ridges and valleys. More particularly, the RF sensing permits imaging of live tissue just below the surface of the skin to reduce spoofing, for example. The entire contents of the Setlak et al. patent are incorporated herein by reference.

Another example of a fingerprint sensing device is disclosed in U.S. Pat. No. 5,325,442 to Knapp. The fingerprint sensing device has a row/column array of sense elements which are coupled to a drive circuit and a sense circuit by sets of row and column conductors, respectively. The sense elements are actively addressable by the drive circuit. Each sense element includes a sense electrode and a switching device, such as a thin film transistor (TFT) switching device, for active addressing of that sense electrode. The sense electrodes are covered by an insulating material and are for receiving a finger. Capacitances resulting from individual finger surface portions in combination with sense electrodes are sensed by the sense circuit by applying a potential to the sense electrodes and measuring charging characteristics.

Historically, electronic integrated circuits generally achieve reduced fabrication costs by using fabrication processes with smaller electronic device geometries. With smaller device geometries the circuit itself becomes smaller, using less silicon, and thus costs less to fabricate. Electronic fingerprint sensors, however, generally cannot be made smaller than the area of the finger skin that needs to be imaged. Smaller component geometries may not reduce the fingerprint sensor die size or cost significantly. One of the only results of smaller component geometries may be unused silicon space under the sensor pixels.

One approach to reducing the cost of fingerprint sensing is to design systems that can work effectively using images of smaller areas of skin. This approach has been used in a variety of devices. A second approach is to use sliding sensors. With sliding sensors, either the finger or the sensor move during the data acquisition process, which allows a small sensor to generate images of larger pieces of skin. Yet, the sliding sensors may be subject to significant image distortion, and/or they may provide an inconvenient user paradigm.

Image distortion or noise may also be present when it may be desirable to sense a finger image from fingers positioned at a relatively greater distance away from an array of finger sensing pixels. For example, it may be desirable to extend the range of electric field based finger sensors so that they can image fingers through significantly thicker dielectric materials such as molded plastic structures.

Integrated circuit based fingerprint sensors used in personal electronic devices, such as, for example, laptop computers and cellular telephones may be generally effective sensing fingers for user identity authentication. However, these finger sensors generally require the finger to be placed in a very close proximity to the array of finger sensing pixels. The need for close proximity to the user's finger typically makes the mechanical packaging and the integration of these devices into their host products more difficult and more costly.

Some approaches to address integrated circuit packaging of these devices include a special molded package with an opening in the molding allowing the finger a close approach to the array, and a specialized packaging on thin flex circuit substrates that allows the finger to be placed close to the sensing array, for example. Specialized packaging increases the cost of these sensors.

The need for the user's finger to be close to the array of finger sensing pixels may limit the thickness of the material that can be placed over that array, which may increasingly restrict the use of both protective and cosmetic coatings over the array area. Mechanically integrating these sensors into their host devices typically requires that the finger sensor project through a hole in the host device's case, so that the array of finger sensing pixels can be located about flush with the external surface of the case.

However, a negative aspect of these mounting arrangements may include increased difficulty and cost to seal the opening for the finger sensor in the host device case against the ingress of moisture, dust, and other contaminants. Additionally, the opening in the case with the finger sensor protruding may be cosmetically unacceptable to the intended appearance of the host device, and mounting the finger sensor in an opening in the case may be difficult and costly in some devices.

SUMMARY OF THE INVENTION

In view of the foregoing background, it is therefore an object of the present invention to provide a finger sensing device that can generate a reduced noise finger image from a finger positioned at a relatively large distance from the array of finger sensing pixels.

This and other objects, features, and advantages in accordance with the present invention are provided by a finger sensing device that may include an array of finger sensing pixels to receive a user's finger adjacent thereto. Each finger sensing pixel may include a finger sensing electrode. The finger sensing device may include a finger drive electrode configured to couple a drive signal through the user's finger to the array of finger sensing pixels and differential pixel measurement circuitry coupled to the array of finger sensing pixels and configured to generate a plurality of interpixel difference measurements for adjacent pairs of the finger sensing pixels. Accordingly, the finger sensing device may generate a reduced noise finger image from a finger positioned at a relatively large distance from the array of finger sensing pixels.

The finger sensing device may further include a cover layer over the finger sensing pixels having a thickness in a range of 100-900 microns, for example. The differential pixel measurement circuitry may include balanced differential pixel measurement circuitry. The balanced differential pixel measurement circuitry may include a respective differential amplifier stage coupled to each finger sensing electrode of each finger sensing pixel and switching circuitry to selectively couple respective pairs of differential amplifier stages in a differential configuration for the adjacent pairs of the finger sensing pixels. The balanced differential pixel measurement circuitry may also include an output stage coupled to the switching circuitry, for example.

The array of finger sensing pixels may include rows and columns of finger sensing pixels. The differential pixel measurement circuitry may include switching circuitry for generating the plurality of interpixel measurements for adjacent pairs of the finger sensing pixels along both rows and columns of the array of finger sensing pixels, for example. The finger sensing device may further include image generating circuitry coupled to the differential measurement circuitry and configured to generate a composite finger image based upon the interpixel measurements for adjacent pairs of the finger sensing pixels along both rows and columns of the array of finger sensing pixels, for example.

The image generating circuitry may further include kernel filtering circuitry coupled to the differential measurement circuitry. The finger sensing device may further include a semiconductor substrate, for example. The array of finger sensing pixels may be on the semiconductor substrate. The finger sensing device may further include a radio frequency drive signal generator coupled to the finger drive electrode.

A method aspect is directed to a method of sensing a finger that may include receiving a user's finger adjacent an array of finger sensing pixels, each finger sensing pixel comprising a finger sensing electrode. The method may also include coupling a drive signal through the user's finger to the array of finger sensing pixels via a finger drive electrode, for example. The method may further include generating a plurality of interpixel difference measurements for adjacent pairs of the finger sensing pixels using differential pixel measurement circuitry coupled to the array of finger sensing pixels, for example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

Figure 1:
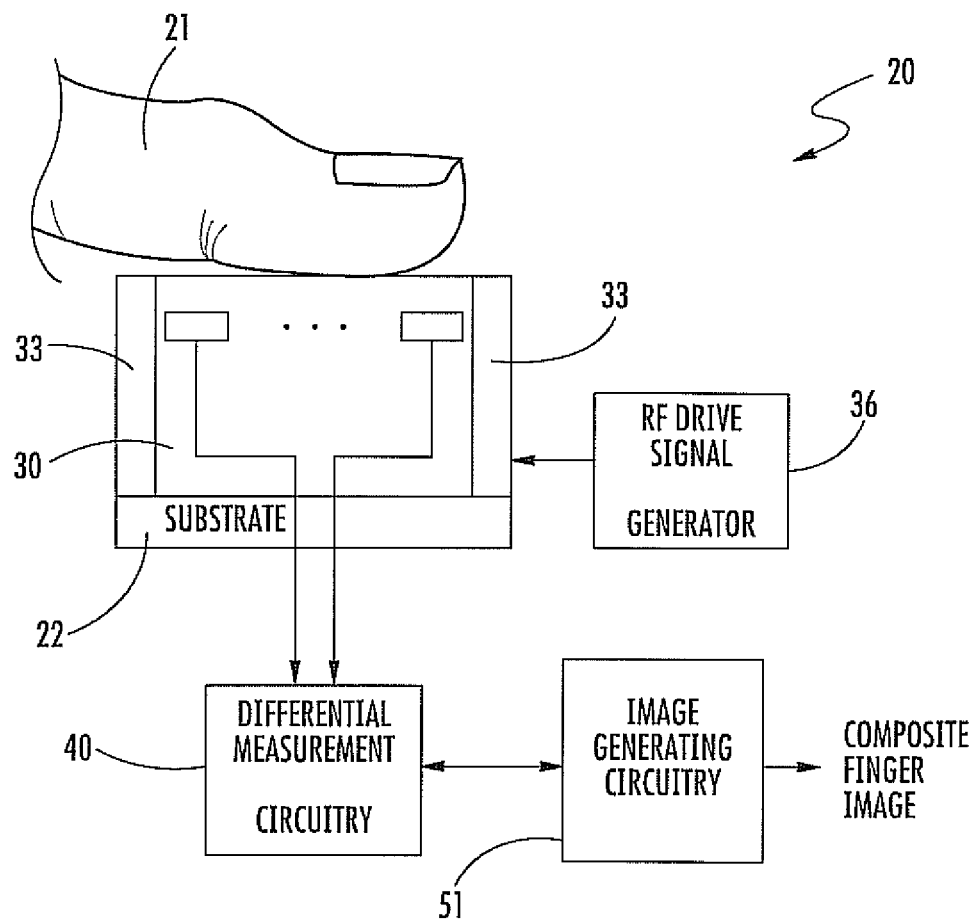
FIG. 1 is a schematic block diagram of a finger sensing device in accordance with the present invention.

Referring initially to FIG. 1, a finger sensing device 20 includes an array of finger sensing pixels 30 to receive a user's finger 21 adjacent thereto. The array of finger sensing pixels 30 is carried by a semiconductor substrate 22. The array of finger sensing pixels 30 may be any array size, as will be appreciated by those skilled in the art. Each finger sensing pixel 31 may be an electric-field sensing pixel. In some embodiments, each finger sensing pixel may be a capacitive sensing pixel, for example, or other type of sensing pixel. Each finger sensing pixel 31 includes a finger sensing electrode 32. A finger drive electrode 33 is configured to couple a drive signal through the user's finger 21 to the array of finger sensing pixels 30. Of course, the finger drive electrode 33 may couple a drive signal through more than one user's finger, and more than one finger drive electrode may be used. A radio frequency drive signal generator 36 is coupled to the finger drive electrode 33.

As will be appreciated by those skilled in the art, the finger sensing device 20 operates by injecting a small electrical signal from the finger drive electrode 33 into the conductive layer of the skin of the user's finger 21. The shape of the electric field generated by that conductive layer of skin is then measured.

The finger drive electrode 33 may be configured to inject the small electrical signals into the users' finger in one of two ways. The finger drive electrode 33 may be configured to operate as a contact electrode finger drive. Alternatively or additionally, the finger drive electrode 33 may be configured to operate as an insulated electrode finger drive. The finger drive electrode 33 may be configured to operate using other techniques, for example, electric and magnetic induction techniques.

When the finger drive electrode 33 is configured to operate as a contact electrode finger drive, an electrically conductive surface makes direct electrical contact with the surface of the user's finger 21. Electrical signals on the finger drive electrode 33 are coupled into the user's finger 21 with varying degrees of attenuation, where the attenuation depends on the size of the finger-to-electrode contact area, and on the electrical properties of the finger skin itself. It should be noted that the electrical properties of finger skin may vary from person to person and from moment to moment over a range of several orders of magnitude.

Figure 2:
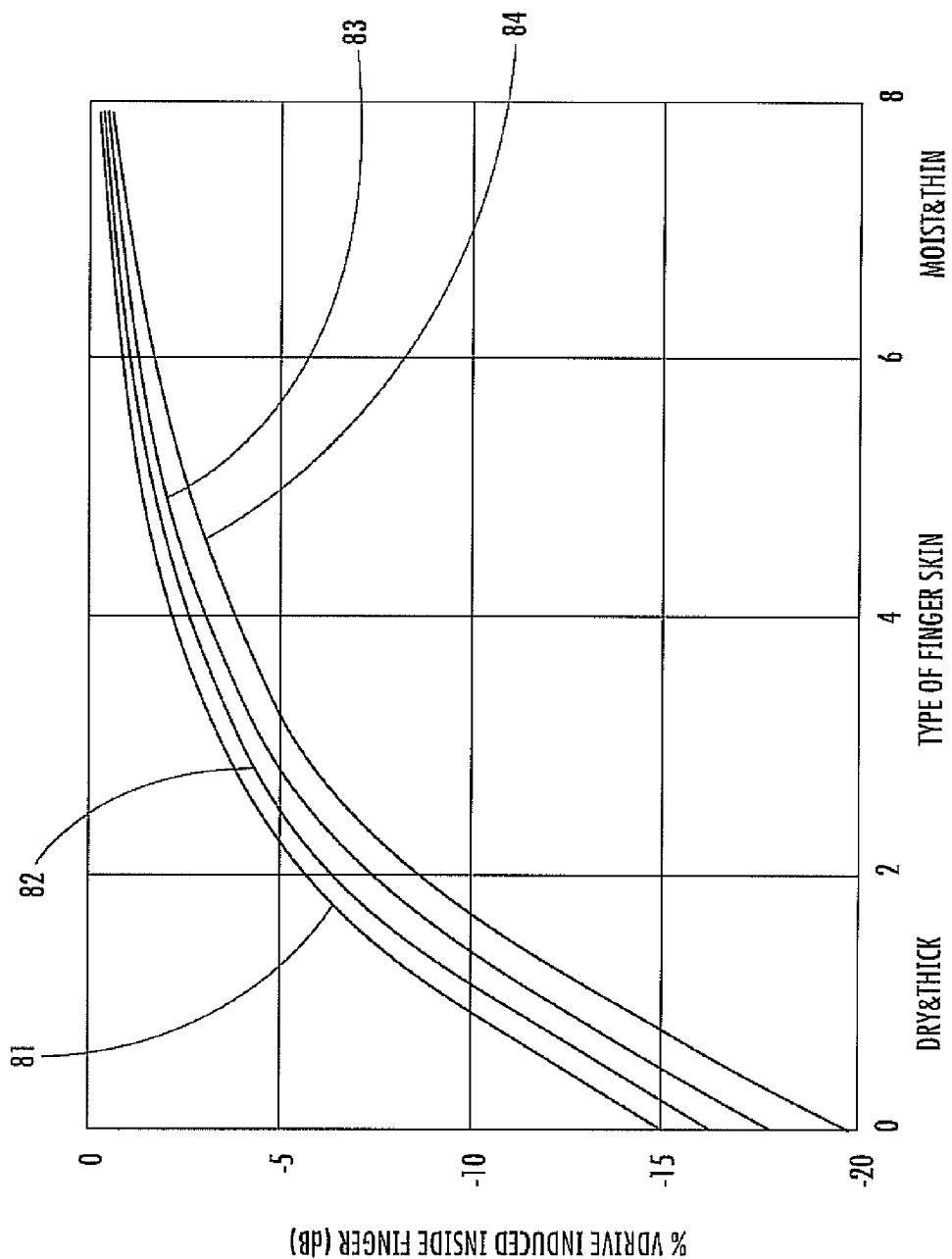
FIG. 2 is a graph of skin electrical properties versus drive signal attenuation.

The curves 81, 82, 83, 84 illustrated in the graph of FIG. 2 are derived from electrical modeling and show the drive signal attenuation inside a user's finger 21 as a function of the contact area and skin electrical properties. The skin electrical properties range from very thick dry skin at the left of the chart to thin moist skin at the right of the graph. The four different curves represent four different finger contact areas, with the upper curve 81 representing the largest area and the lower curve 84 representing the smallest area.

When the finger drive electrode 33 is configured as an insulated electrode finger drive, an electrically conductive electrode is separated from the surface of the user's finger 21 by a thickness of insulating material. Electrical signals on an insulated electrode couple capacitively to nearby skin surfaces. For insulated electrodes, the signal attenuation due to coupling depends on the combination of several parameters including the area of the region of skin close to the electrode, the thickness of the insulating material between the electrode and the finger, the electrical properties of that insulating material, and the electrical properties of the finger skin itself.

Figure 3:
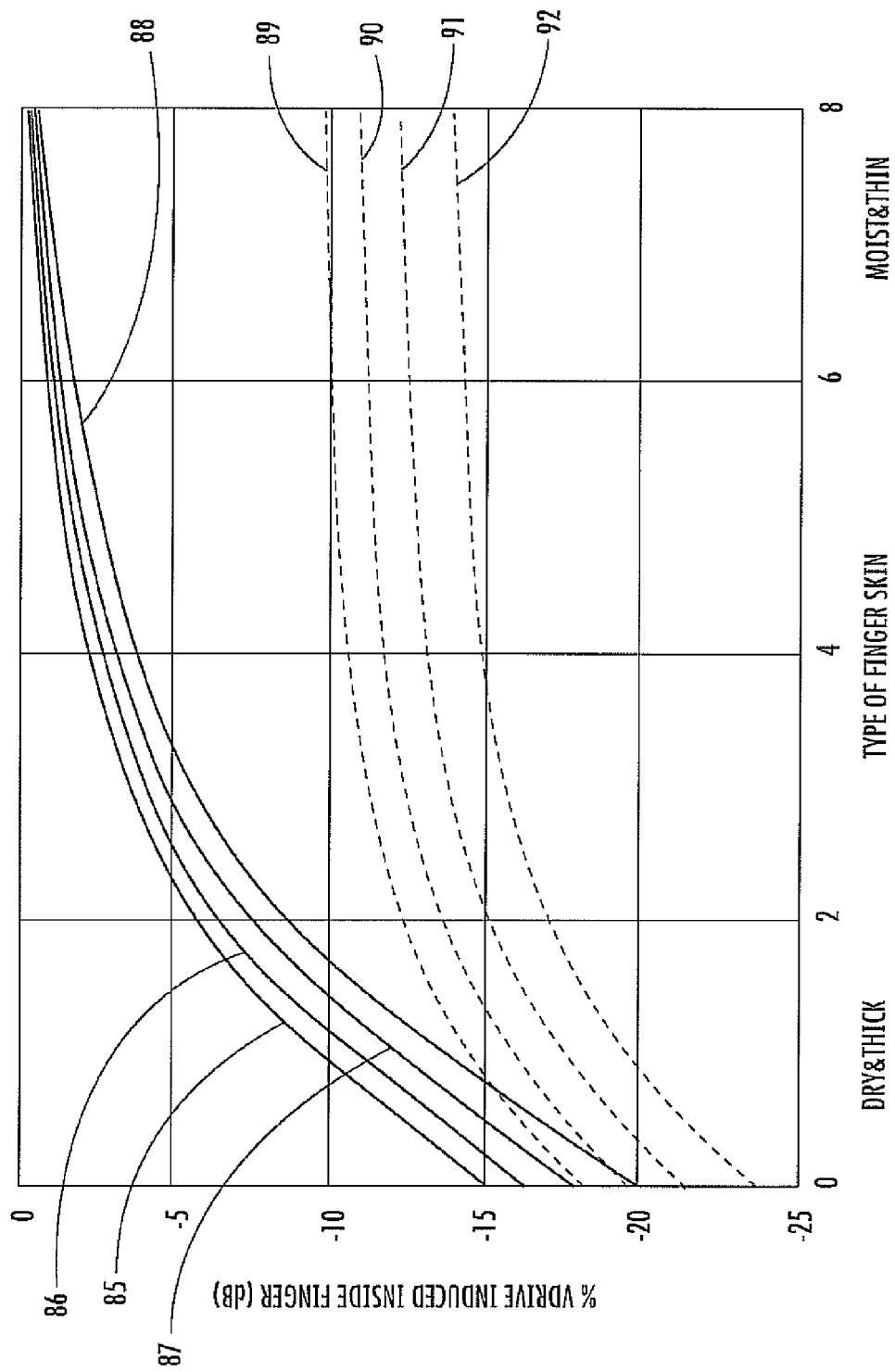
FIG. 3 is a graph of skin electrical properties versus drive signal attenuation for direct and insulated drive finger contact arrangements.

The curves illustrated in the graph of FIG. 3, derived from electrical modeling, compare finger drive signal attenuation for direct contact finger drive arrangements 85, 86, 87, 88 with typical insulated finger drive arrangements 89, 90, 91, 92, over the range of finger skin electrical properties.

It may be important to note that insulated finger drive systems tend to reduce the variation in drive signal attenuation between the dry, thick skinned fingers and the moist, thin skinned fingers. In the example above, the insulated drive handles the finger skin variation with half the dynamic range for the direct drive system. In general, if a fixed voltage boost is applied to the insulated finger drive electrode system to overcome the differences in average attenuation, the resulting system may demand significantly less dynamic range to handle finger skin variation than a direct drive system as shown by the curves 89, 90, 91, 92. This arrangement reduces the problems of maintaining a large system dynamic range when imaging fingers through thicker insulating materials, as will be appreciated by those skilled in the art.

The array of finger sensing pixels 30 includes rows and columns of finger sensing pixels. Two-dimensional arrays of finger sensing pixels 31 are often used to measure the shapes of remote objects, by measuring the intensity of an energy field that has been affected by the remote target object, for example, the user's finger 21. Typically the energy measured by each pixel 31 of the array 30 is used to set a pixel value in an image of the remote object. An example of such remote sensing is the measurement of fingerprint patterns of fingers that are not in contact with the sensor array, but are separated from that array by protective material of various thicknesses. In a typical system of this type, the shape information (a spatial signal impressed on the underlying field) becomes attenuated as the target object is moved further from the array of finger sensing pixels.

To more effectively measure the attenuated spatial signals that represent the user's finger shape information when the user's finger is a significant distance from the sensor array, the finger sensing device 20' includes differential pixel measurement circuitry 40. coupled to the array of finger sensing pixels 30 and configured to generate a plurality of interpixel difference measurements for adjacent pairs of the finger sensing pixels 31.

As will be described in further detail below, the differential pixel measurement circuitry 40 advantageously addresses the problems of measuring shape information from very small signal differences between finger sensing pixels 31 having large overall signals on them, and measuring attenuated high-spatial-frequency signals in the presence of strong lower-spatial-frequency signals. The differential measurement circuitry 40 also advantageously measures the weak spatial signals while reducing noise. As will be appreciated by those skilled in the art the differential pixel measurement circuitry 40 may use spatial analog to delta/sigma time series measurements to accomplish the above-noted objectives.

The attenuation of the shape information with distance is more evident in arrays of electric field finger sensing pixels that are used to measure fingerprints. RF electric fields such as those used in these finger sensing devices may be modeled as simple diffusive fields, and the spatial information attenuation analyzed in such a model.

Figure 4:
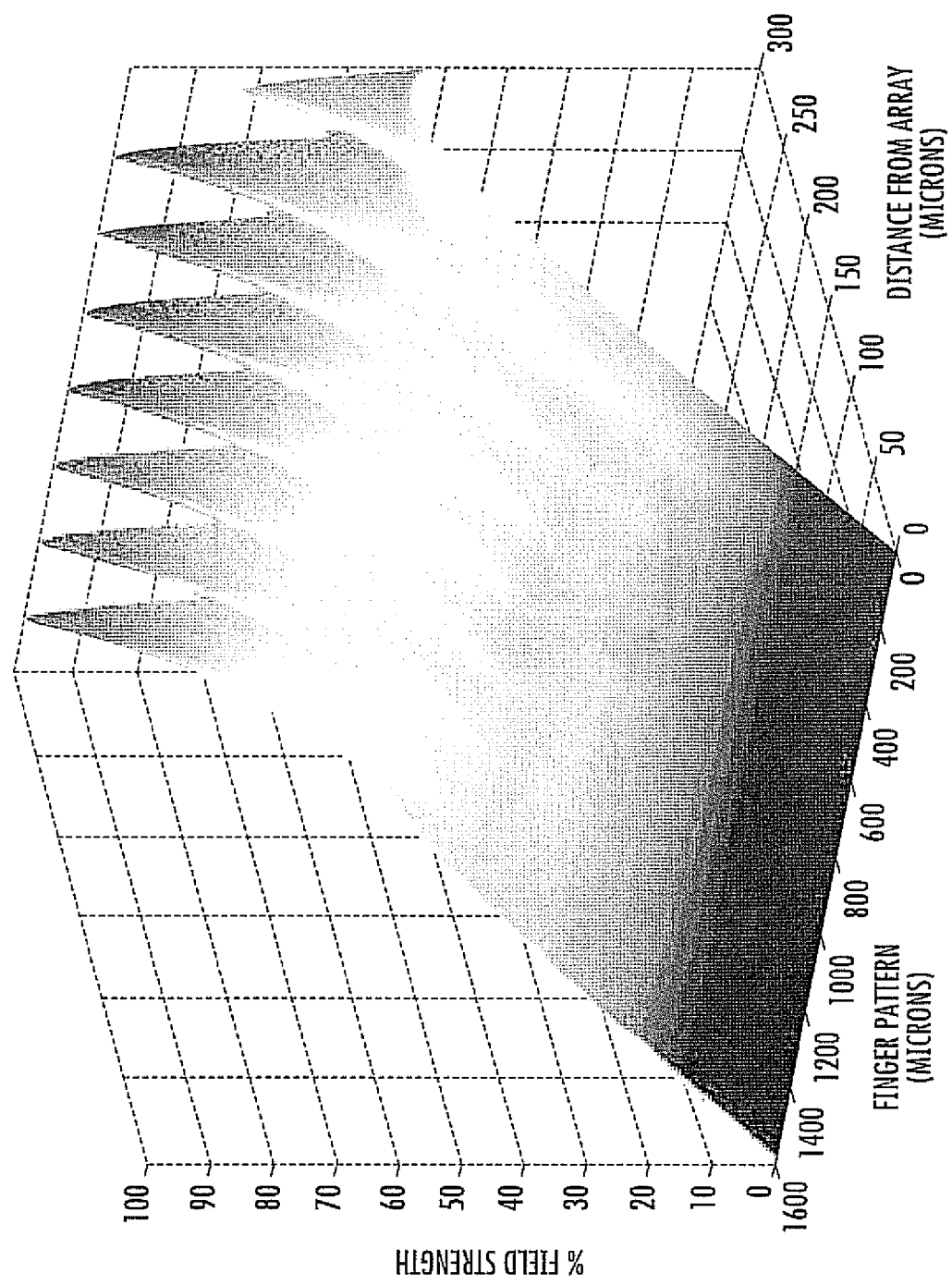
FIG. 4 is a graph of electric field intensity in a 2-dimensional plane.

The graph in FIG. 4 illustrates the results of a field diffusion simulation, as an illustration of the field intensity in a 2-D plane. In the graph, the shape-information-bearing quantity is the difference between the peaks and the valleys of the spatial sine wave. The graph illustrates how the field generated by a spatially-varying electric field intensity source (at the right side of the graph) attenuates as the distance from the source increases. This simulation illustrates some of the problems to be addressed to more accurately measure the shape of a fingerprint pattern that is remote from the array of finger sensing pixels.

In addition, the attenuation of shape information in the field signals may not be uniform for information at different spatial frequencies. In a finger sensing device including electric field based finger sensing pixels that do not use focusing mechanisms, higher spatial frequencies are typically attenuated more than lower spatial frequencies, in accordance with the well known field diffusion equations. Curves 93, 94, 95, 96 illustrate distance versus modulation ratio for 16, 8, 4, and 2 pixels respectively. The graph of FIG. 5 illustrates the results of simulations indicating how the attenuation is dependent on the spatial frequency content of the shape being measured.

Figure 5:
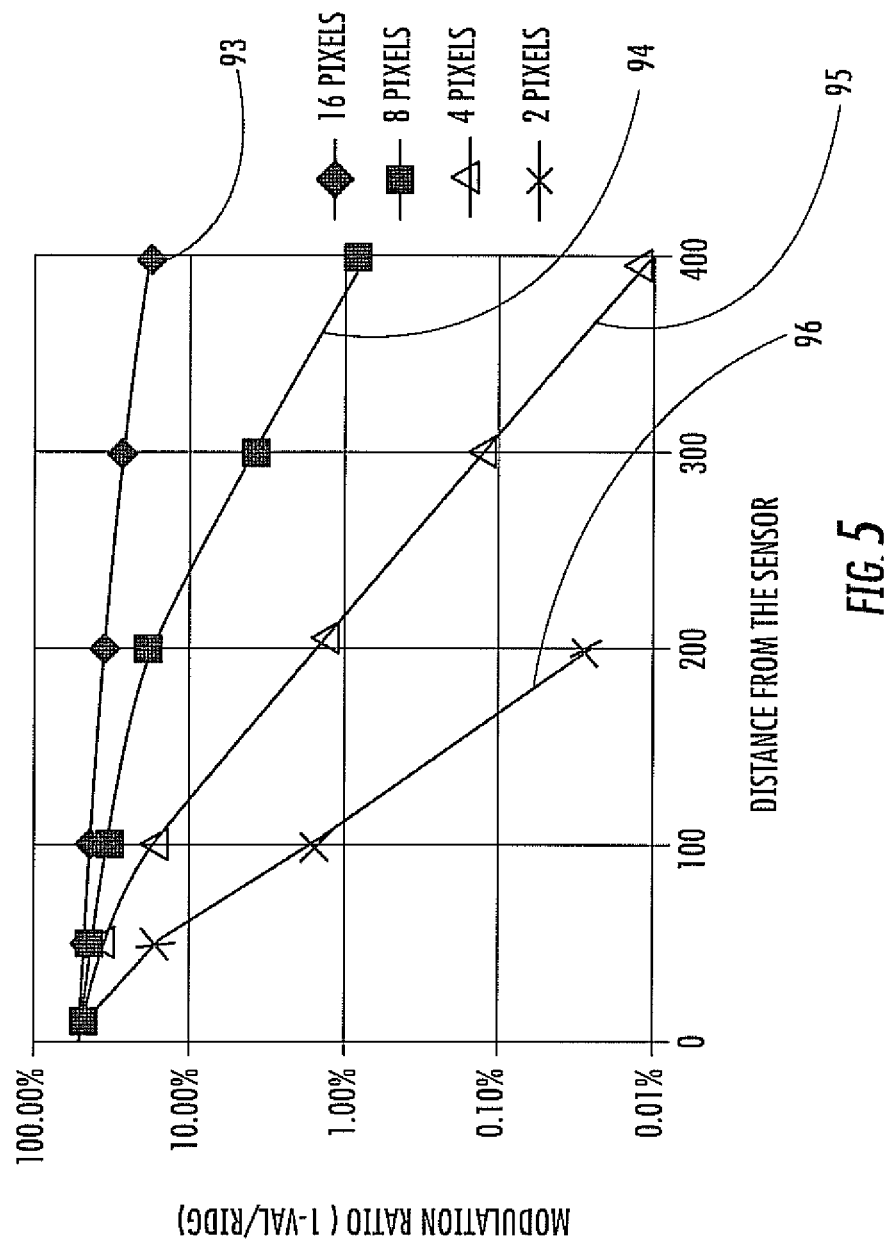
FIG. 5 is a graph of modulation ratios versus distance from the array of finger sensing pixels for different sized arrays of finger sensing pixels.

The graph of FIG. 5 uses the modulation ratio as a normalized indication of relative signal strength on the y axis. Features of the largest size 93 (16 pixels in this simulation) have the lowest spatial frequency, and experience the least attenuation with increasing distance.

Based upon the graph in FIG. 4, the shape signal (the differences between the peaks and the valleys) attenuates as you move to the left on the graph much faster than the average value of the field. As a result, the signals at a remote array of finger sensing pixels may have very small pixel to pixel differences in the presence of a much larger average signal. Ultimately, to reproduce the fingerprint pattern shape the small peak to valley differences from the large overall pixel signals may be extracted.

The small difference signal may be extracted from the larger overall signal at several points within the finger sensing device. Each possible location of the extraction function may have various advantages and disadvantages. The best choice may depend on the specific details of the system and may vary from finger sensing devices. Of particular interest is the constraint that the parts of the overall system that carry information that is represented as small differences between large signals must have a large dynamic range. By placing the process that extracts the small pixel-to-pixel signal (or conversely nullifies the large common signal) early in the processing chain, the dynamic range of the remainder of the finger sensing device may be reduced at the expense of some increase in complexity at the extraction/nullification point.

Suppressing the large common signal (discussed above) at the sensor itself, or in the amplification stage may be useful in reducing the dynamic range of the downstream signal processing and image processing. In one method, the system applies an inverted (and possibly phase shifted for AC sensing) version of the excitation signal (or of the average of the received signal across the array) equally to the array of finger sensing pixels. The amplitude of the inverted signal may optionally be adjusted during imaging to achieve the optimum null. The resulting signal fed to the subsequent amplification stages may have the majority of the large common mode signal removed, so that the small pixel-to-pixel variations can be amplified without requiring excessive dynamic range from the amplifiers.

In electric-field based finger sensing devices, the inverted signal can be injected directly at the electric field sensing pixel antenna, by placing a small electrode carrying the inverted signal beneath the antenna plates, as will be appreciated by those skilled in the art. By suppressing the relatively strong common signal at the antenna, a high-gain, low-noise sense amplifier may be used with little consideration of saturation.

The inverted signal insertion mechanism for suppressing large average signals at the array of finger sensing pixels is advantageous even when the mechanisms discussed below are employed because it may limit the common mode voltages seen at the sense amp inputs.

In one implementation, the average received signal from a group of finger sensing pixels may be used to establish a signal, which is then used as the suppression signal source. This mechanism allows the array of sensing pixels to adapt to different overall signal levels, by varying the suppression signal, depending on the situation. One way of generating an average signal is to interconnect a group of finger sensing pixels that may not currently be scanned, and measuring the average signal developed on this group of interconnected pixels. In real-world use, physical arrays of finger sensing pixels typically include a small number of pixels that are malfunctioning. The finger sensing device should continue to operate with the least amount of disruption possible in spite of the malfunctioning pixels. One method of computing a central tendency signal, that is less sensitive to failure of a small number of pixels than the average signal, is to generate a median signal.

Figure 6:
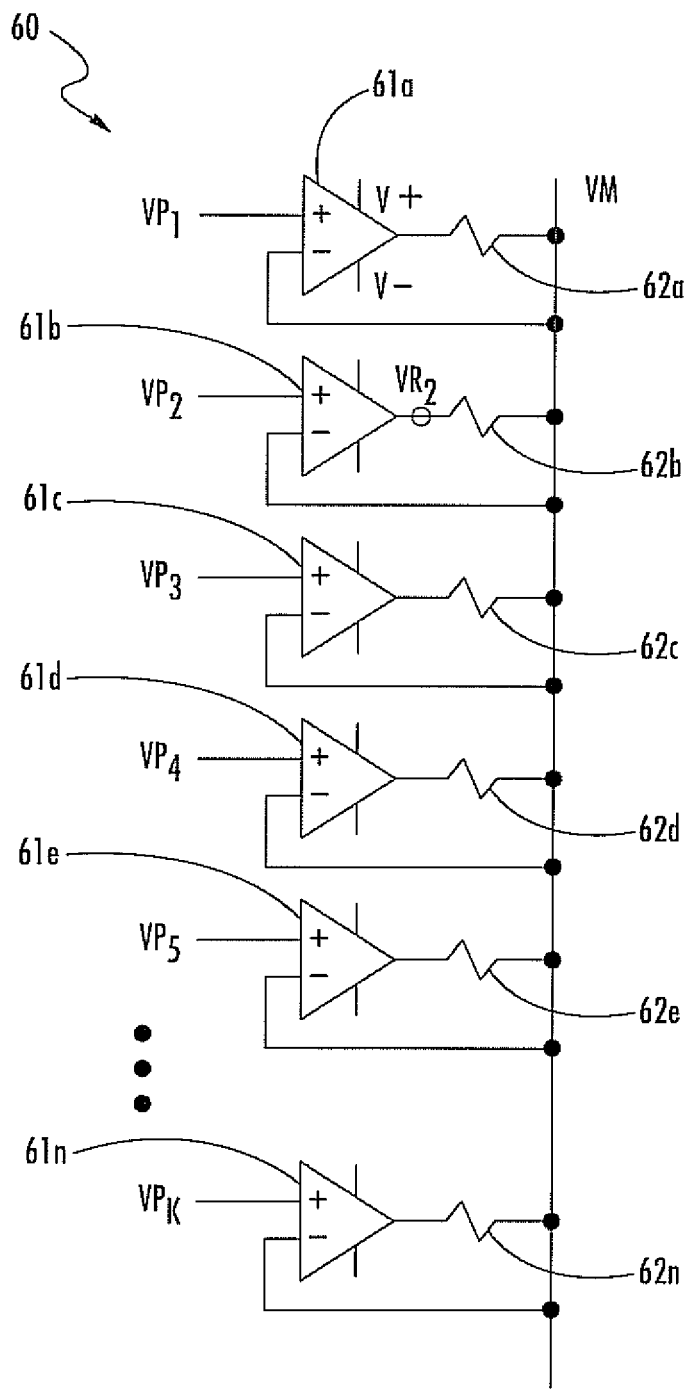
FIG. 6 is a schematic diagram of an analog implementation of a weighted median filter for use with the finger sensing device of the present invention.

Referring now additionally to the schematic diagram in FIG. 6, a filter circuit 60 that acts as a weighted median filter which can generate a signal useful for suppressing large common signals in the analog portions of the architecture is illustrated. The filter circuit 60 may be used in the finger sensing device 20 alone or with additional filters or filtering techniques, for example, differential measurement circuitry 40 that is described in further detail below. The filter circuit 60 includes differential amplifiers 61a-61k and corresponding resistors 62a-62k that are to be coupled to each finger sensing pixel. Pixel weighting factors may be determined by the relative values of the current summing resistors 62. $V_{rx}$, the voltage through a summing resistor 62 is determined by $V_{rx}=V+$ if ($V_{px}>Vm$) and $V_{rx}=V-$ if ($V_{px}<=Vm$). Vm is the median voltage and $V_p$ is the pixel feed voltage. The weighted median filter may be expressed as: $\Sigma(V_{rn}-Vm)*R_n=0$ for n=1 to k.

As can be seen from the graph in FIG. 5, the amount of attenuation seen in signals representing remote shapes at a particular distance can vary as a function of the spatial frequency content of that shape information. Therefore, accurate measurement of the remote shapes may require spatial frequency sensitive compensation, or essentially spatial filtering.

Spatial frequency compensation can be performed at several different places within the finger sensing device. Spatial filtering may be applied directly at the array of finger sensing pixels, in the analog amplification stage, or digitally after the data conversion in the image generating and processing stage. The same kind of trade-offs take place here as discussed previously regarding the large dynamic ranges for the stages upstream of the spatial frequency compensation, and the costs of incorporating that compensation early in the signal flow versus the reduction in required dynamic range.

Figure 7A:
FIGS. 7a-7c are fingerprint images illustrating the effects of low spatial frequency at a distance from the array of finger sensing pixels.
Figure 7B:
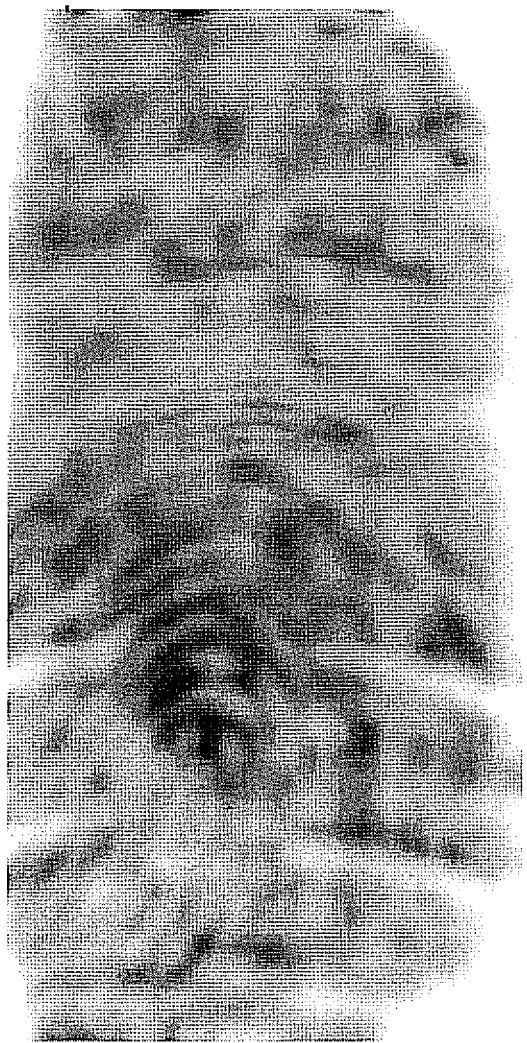
Figure 7C:

Referring additionally to FIGS. 7a-7c the effects of undesired strong low spatial frequency information in the measurements of fingerprints at a distance from the sensor array are illustrated. FIG. 7a illustrates a fingerprint of a user's finger measured from adjacent the array of finger sensing pixels. FIG. 7b illustrates the same user's finger measured by an array of finger sensing pixels that are relatively distant from the user's finger. Dominant energy at spatial frequencies lower than the fingerprint frequencies are illustrated. FIG. 7c illustrates the same fingerprint after digital spatial filtering. Illustratively, the digital spatial filtering was unable to extract the full ridge pattern from the 4-bit gray scale image.

Spatial filtering of digital images is well understood by those skilled in the art, and can be applied at the image processing stage in the finger sensing device. Spatial frequency compensation may be applied at the finger sensing pixel and amplifier levels by applying the signals from multiple sensors in the array to analog summing and differencing blocks configured to implement the convolution kernel functions for the filtering.

Passive impedance planes, such as that described in U.S. Pat. No. 6,067,368 to Setlak et al., the entire contents of which are herein incorporated by reference, may be configured to act as spatial high-pass filters, or as unsharp masking filters, providing a form of spatial frequency compensation. A variety of analog and digital implementations of spatial filters may be applied, as will be appreciated by those skilled in the art.

In addition, methods such as differential pixel measurement via the differential pixel measurement circuitry 40, discussed in further detail below, may be applied to reduce the low spatial frequency signals from dominating the system front end dynamic range, and allow the construction of a spatial frequency compensated shape signal in the image processing stage.

As finger sensing devices measure smaller and smaller signals, the ability to reject or nullify noise becomes more and more important. For example, common noise sources with respect to the sensing stage of a finger sensing device may include external interference, excitation noise, intrinsic sensor noise, fixed pattern noise from the array of finger sensing pixels, and ground potential noise. Potential noise management techniques to address noise sources in the sensing stage may include balanced differential measurement (discussed in further detail below), and correlated double sampling.

With respect to the amplification and signal processing stage of a finger sensing device, common noise sources may include sampling and switching noise, row and column noise, which may include temporal and fixed pattern noise, power rail noise, and component intrinsic noise, which may include temporal and fixed pattern noise. Potential noise management techniques to address noise sources in the amplification and signal processing stage may include differential amplification and signal processing, signal integration, temporal and spatial bandwidth limiting, calibration and compensation, and power rail isolation.

With respect to the data conversion stage of the finger sensing device, common noise sources may include quantization noise, reference noise, and switching noise. Approaches to address noise sources at the conversion stage include hi-resolution data conversion and multi-sample averaging. In the image processing stage of the finger processing device, noise management approaches may include spatial filtering and optimal equalization, frame averaging, heuristic estimation, and feature reconstruction. Of course, there may be other noise sources at each of the various stages of the finger sensing device, and other and/or additional approaches may be used to address these noise sources, as will be appreciated by those skilled in the art.

The differential pixel measurement circuitry 40 advantageously provides a remote shape measuring that applies some elements of the theory behind the delta/sigma method of processing time-series signals to the design of a system for measuring remote shapes, such as fingerprint images. The resulting finger sensing device 20 exhibits the properties to more accurately measure remote shapes as discussed above with reduced impact on cost and complexity compared to standard short distance shape imaging systems.

As will be appreciated by those skilled in the art, a finger sensing device 20 that includes the differential pixel measurement circuitry 40 may provide true balanced differential noise cancellation, intrinsic spatial frequency compensation, intrinsic cancellation of large common mode signals, and highly effective use of finger sensing device bandwidth and dynamic range, for example. Rather than measuring the signals on each finger sensing pixel 31 in the array of finger sensing pixels 30, the differential pixel measurement circuitry 40 measures the differences between adjacent pixels at the same moment in time. Adjacent pixels 31 may be pixels that are spaced by any of 0 to 6 pixels intervening for a typical 500 pixel-per-inch sensor and to image typical ridges and valleys, for example. In some embodiments, the differential measurement circuitry 40 may measure the difference between every other pixel, every third pixel, etc. Hence, the inter-pixel deltas measured are spatial rather than the temporal deltas typically measured in time-domain delta/sigma processing. The measured inter-pixel deltas are processed through the differential pixel measurement circuitry 40, and the original shape image is reconstructed downstream by integrating the inter-pixel deltas via image processing circuitry 51.

Figure 8:
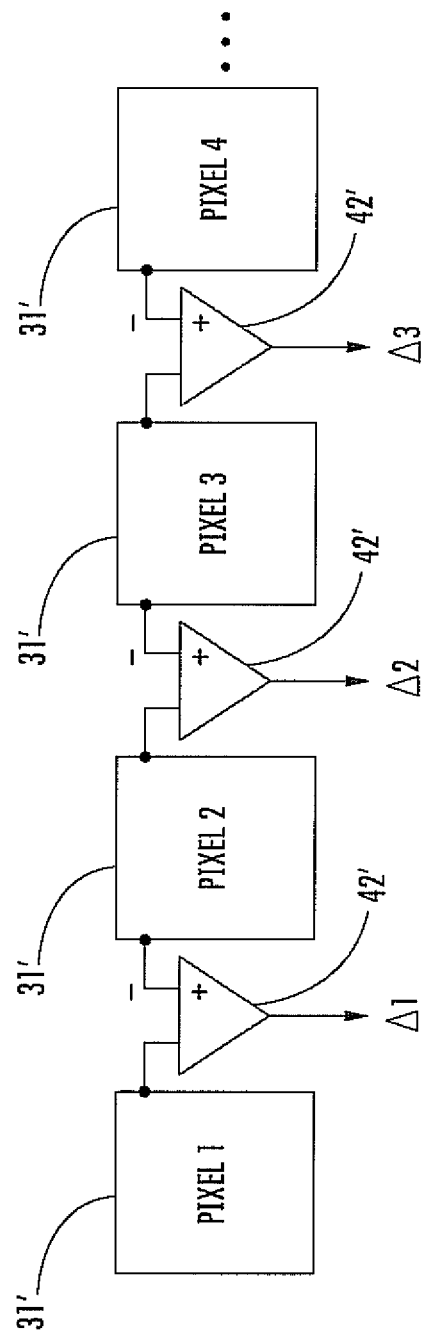
FIG. 8 is a schematic diagram of a portion of a finger sensing device having a one-dimensional array of finger sensing pixels in accordance with the present invention.

Referring now additionally to FIG. 8, an embodiment of a portion of a finger sensing device 20' including a 1-dimensional array of finger sensing pixels 30' and differential pixel measurement circuitry 40' that implements the spatial delta/sigma measurement is illustrated. Time domain delta/sigma processing typically includes the use of a 1-bit analog-to-digital convertor and a variable temporal sample rate. The differential pixel measurement circuitry 40' includes a differential amplifier 41' coupled between adjacent finger sensing pixels 31'.

The measurement of the difference between finger sensing pixels 31 in an array of finger sensing pixels 30 can be designed to be a fully balanced differential measurement, with the common mode signal and noise rejection properties typically associated with that style measurement. The differential pixel measurement then provides cancellation of temporal noise and external interference at the pixel sensors, as well as suppressing the large common mode signals inherent in diffusive field measurements. The resulting difference signals can be amplified to useful levels for subsequent processing.

It should be noted that the intrinsic spatial low-pass filtering property of the field diffusion process may limit the size of the difference signal that the user's finger 21 may induce between any two adjacent finger sensing pixels 31 in the array of finger sensing pixels 30. Any measured signal differences larger than a limit may be clipped, without loss of useful data, because these large differences typically cannot represent the real shape of the user's finger 21, and hence may be spurious.

Figure 9:
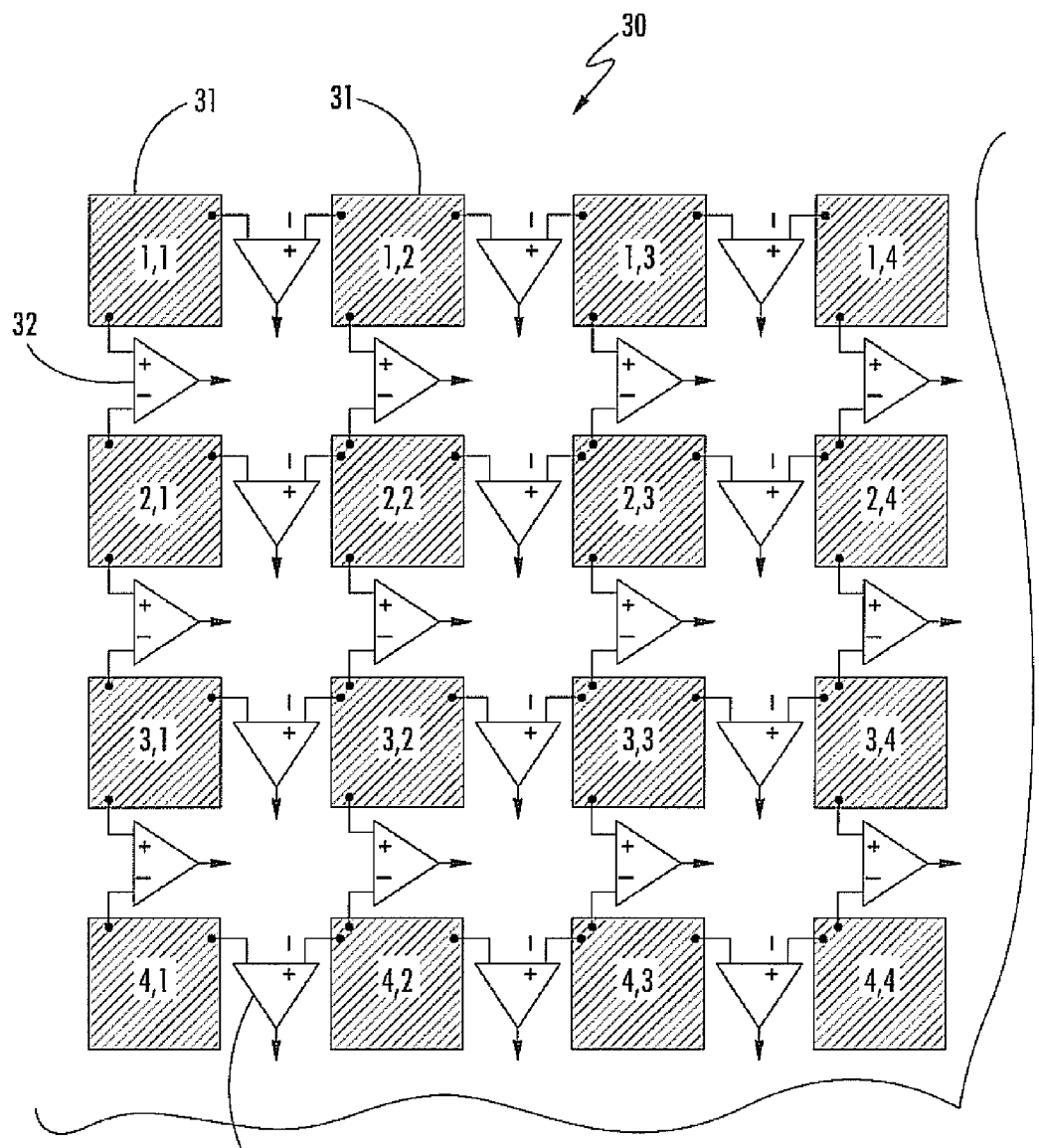
FIG. 9 is a schematic diagram of a portion of a finger sensing device having a two-dimensional array of finger sensing pixels in accordance with another embodiment of the present invention.

Referring now additionally to FIG. 9, the finger sensing device 20 includes a 2-dimensional array of finger sensing pixels 30. More particularly, the array of finger sensing pixels 30 includes rows and columns of finger sensing pixels 31. Thus, it may be beneficial to measure the interpixel differences both in the horizontal direction and the vertical direction, to get a complete set of information about the user's finger 21. To accomplish this, the differential pixel measurement circuitry 40 includes a differential amplifier 41 between adjacent finger sensing pixels 30 in each row, and a differential amplifier between adjacent finger sensing pixels in each column. This adds redundancy to the finger sensing device 20 that may be used to reduce noise. The value of each finger sensing pixel 31 in the final integrated image may be computed by integrating along one of several different "paths" through the array of finger sensing pixels 30 using image generating circuitry 51, for example. Combining the results of several paths may produce a more robust result, as will be appreciated by those skilled in the art. The use of the multiple paths will be described in further detail below. It should be noted that for two-dimensional difference measurements, there are approximately twice as many measurements performed as there would be if direct measurements of the pixel voltages were made, or if one-dimensional measurements were made. The extra measurements may be used to suppress noise and improve accuracy, for example.

Figure 10A:
FIGS. 10a-10c are fingerprint images showing horizontal and vertical differences.
Figure 10B:
Figure 10C:
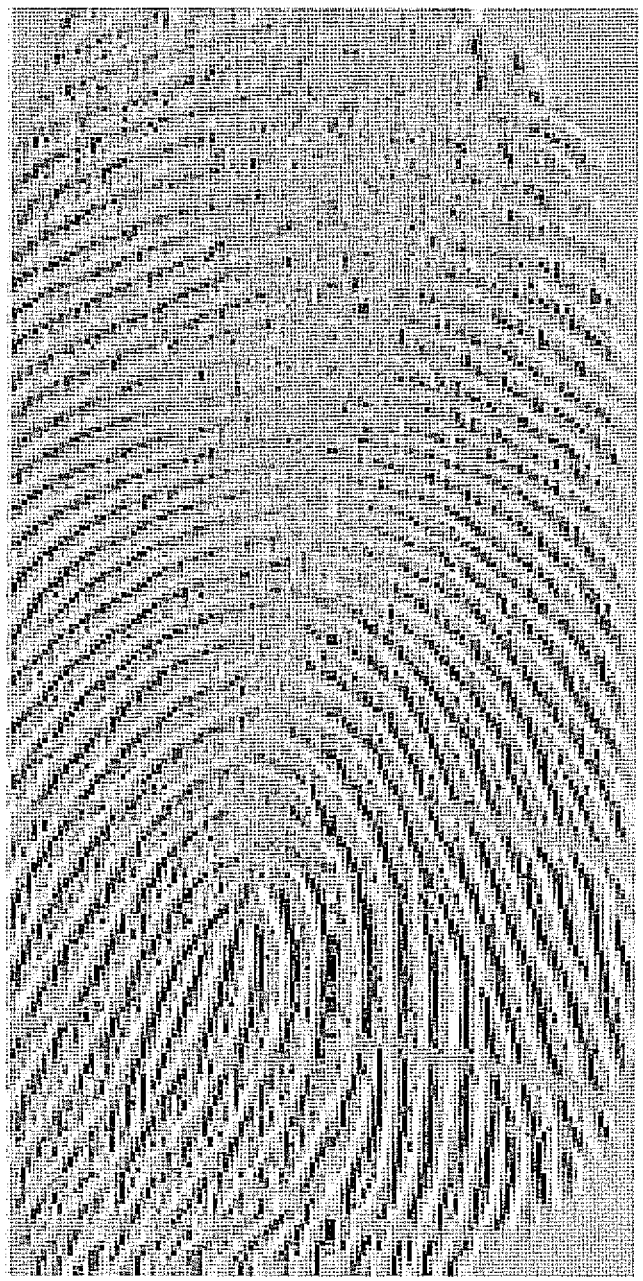

Referring now to FIGS. 10a-10c, images of a user's finger are illustrated. FIG. 10a illustrates an image of a user's finger made from a standard finger sensing device, while FIGS. 10b and 10c illustrate images of a user's finger that represent the interpixel differences in the vertical and horizontal directions measured on the same user's finger, respectively. In the difference images, gray represents areas where the adjacent pixels have little or no difference, white represents a positive difference and black represents a negative difference.

However, as noted above each differential measurement is represented as being performed by a separate differential amplifier. While this approach may be used, it may be desirable to implement measurement of the array of finger sensing pixels by switching the signals from different pixels onto a smaller bank of differential amplifiers. To build an economical and reliable finger sensing device using differential pixel measurement circuitry, it may be desirable to add as little circuitry as possible under each of the finger sensing pixels 31.

Figure 11:
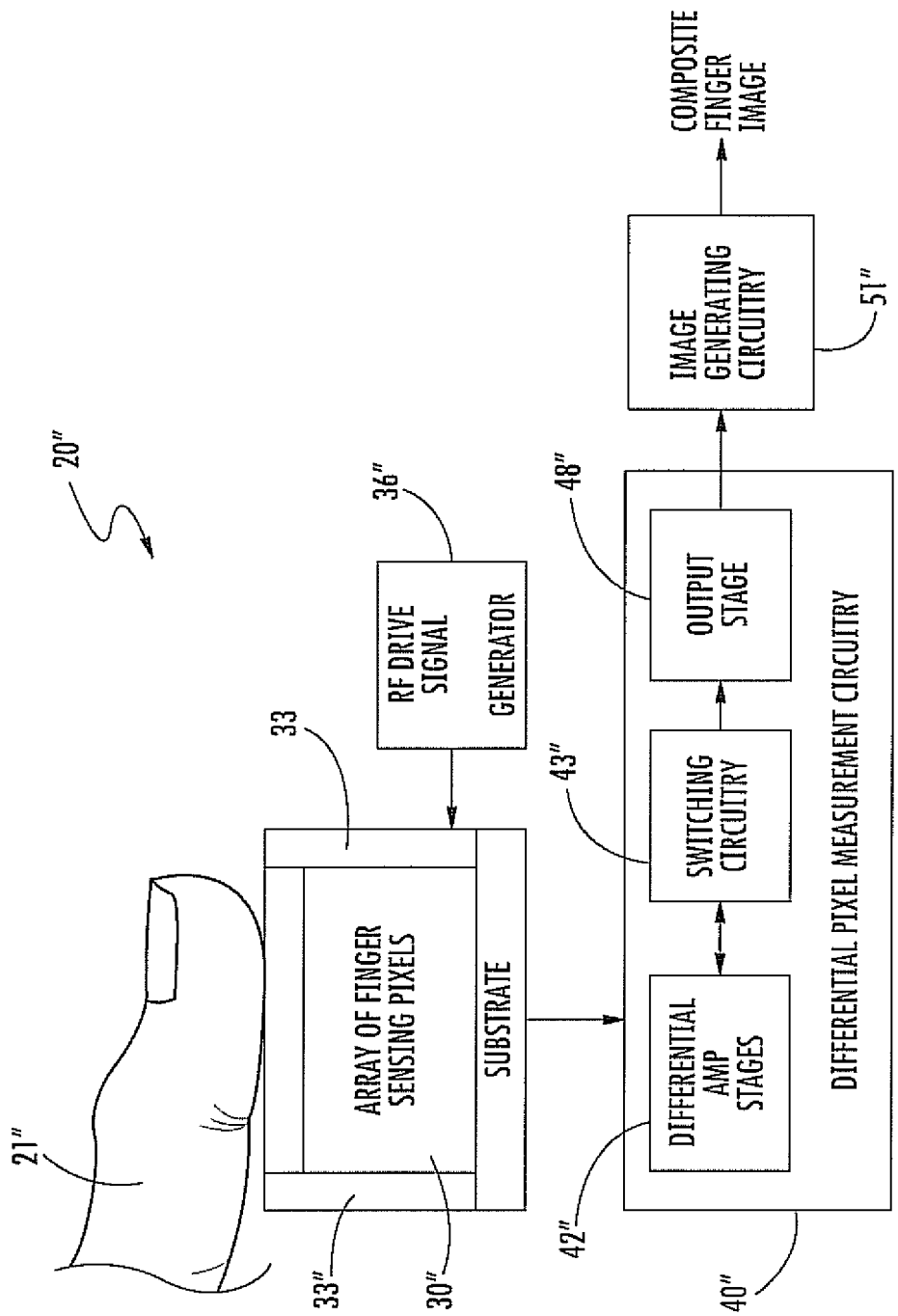
FIG. 11 is a schematic block diagram of a finger sensing device according to another embodiment of the present invention.
Figure 12:
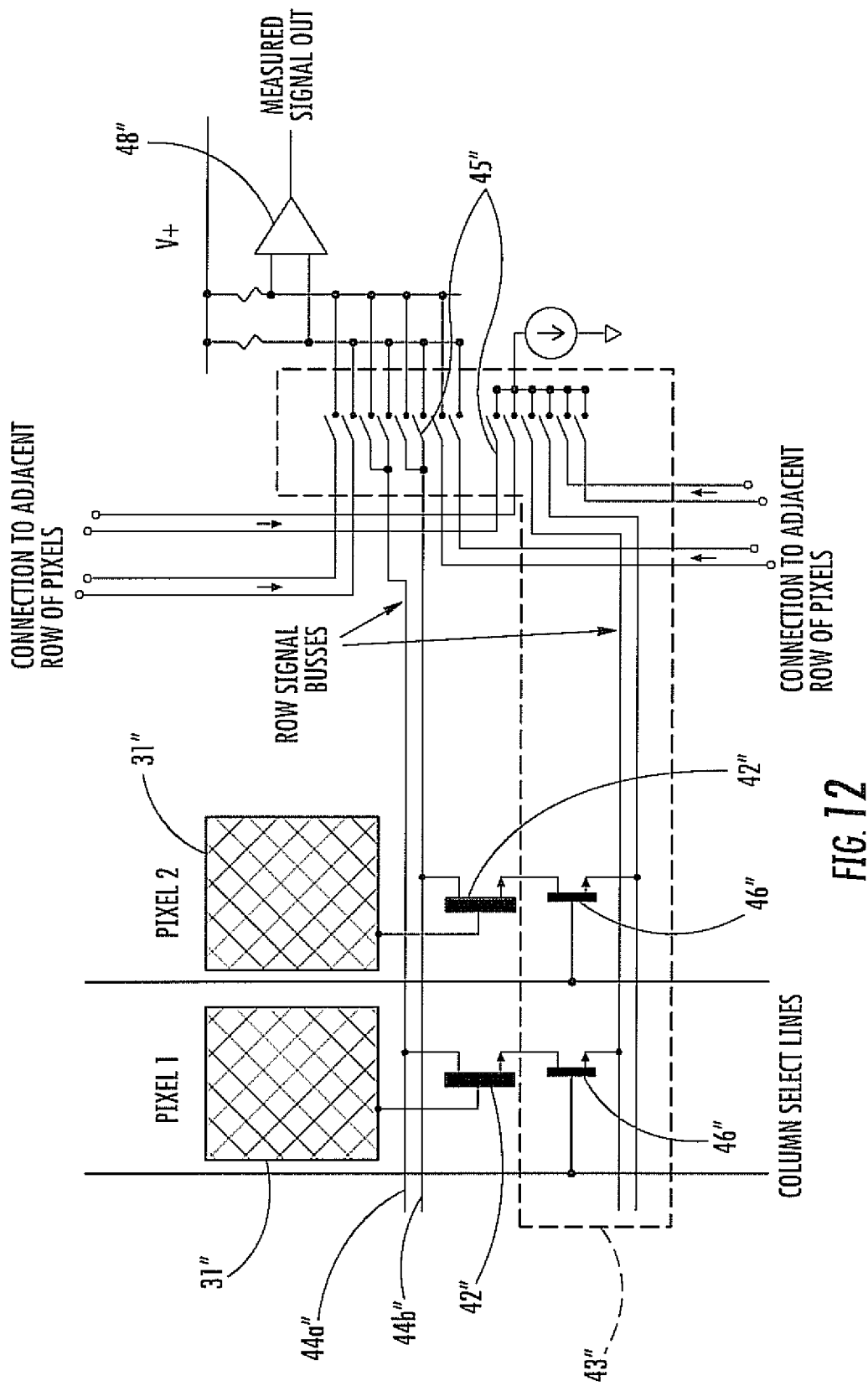
FIG. 12 is a schematic circuit diagram of a portion of a finger sensing device of FIG. 11.
Figure 13A:
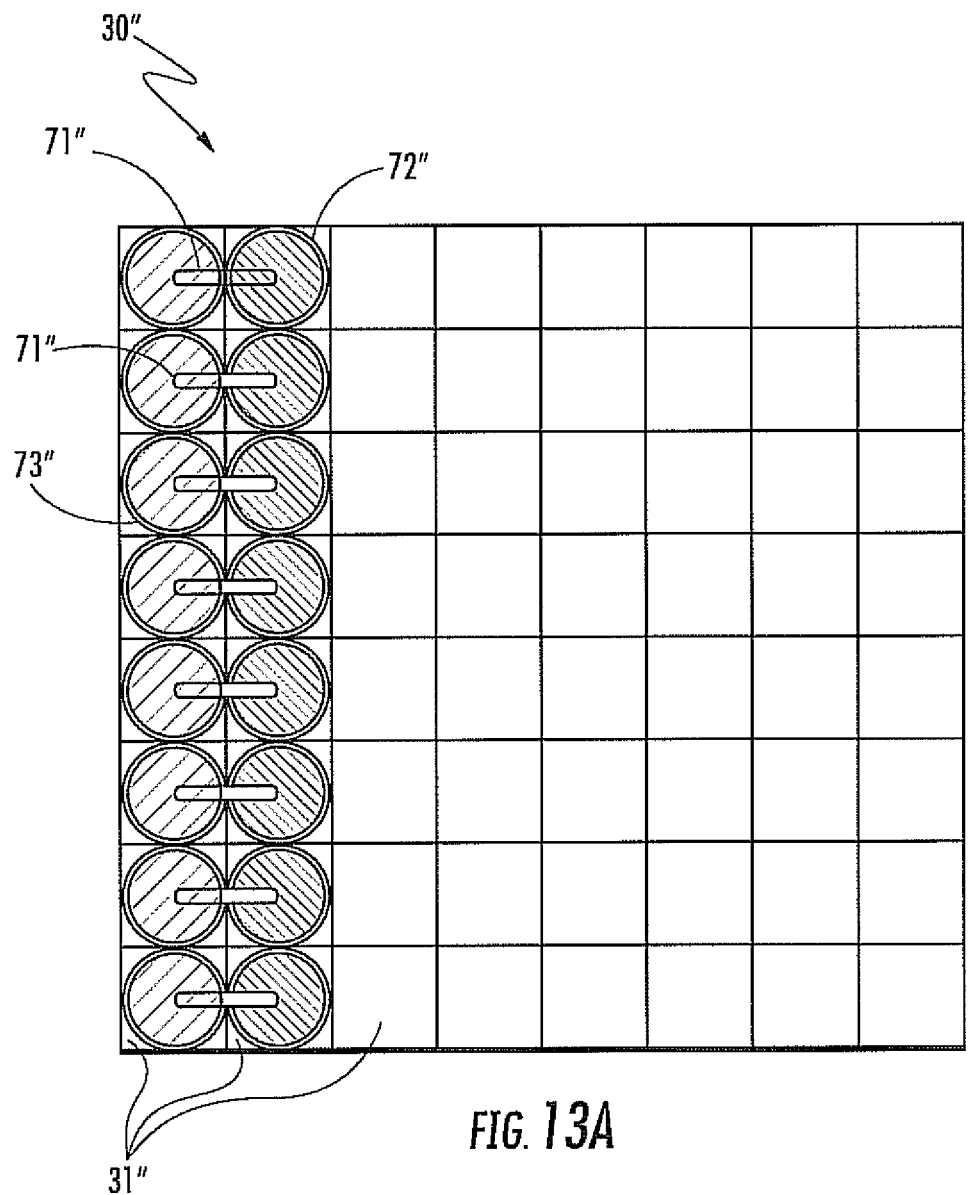
FIGS. 13a-13f are schematic illustrations of a possible scan pattern for an array of finger sensing pixels of a finger sensing device according to the present invention.
Figure 13B:
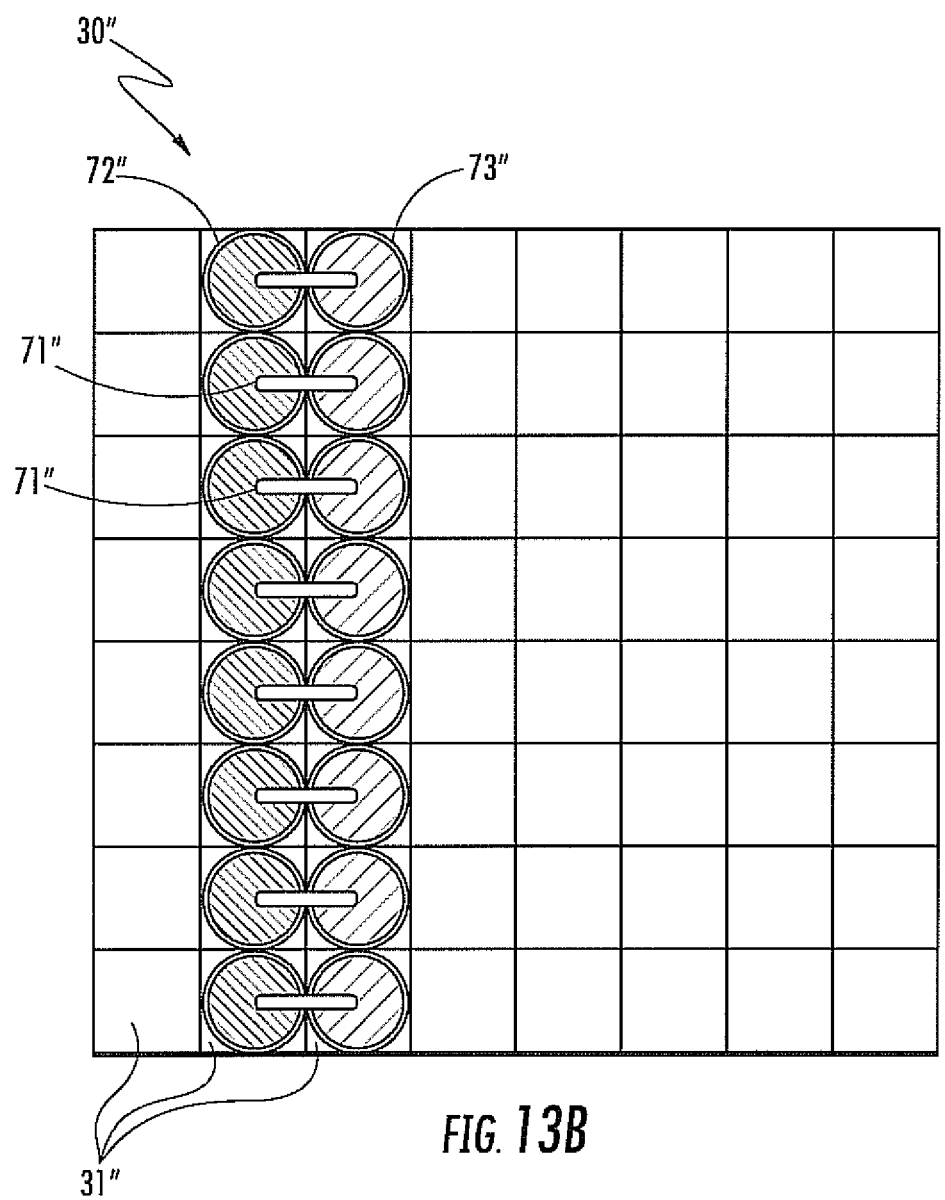
Figure 13C:
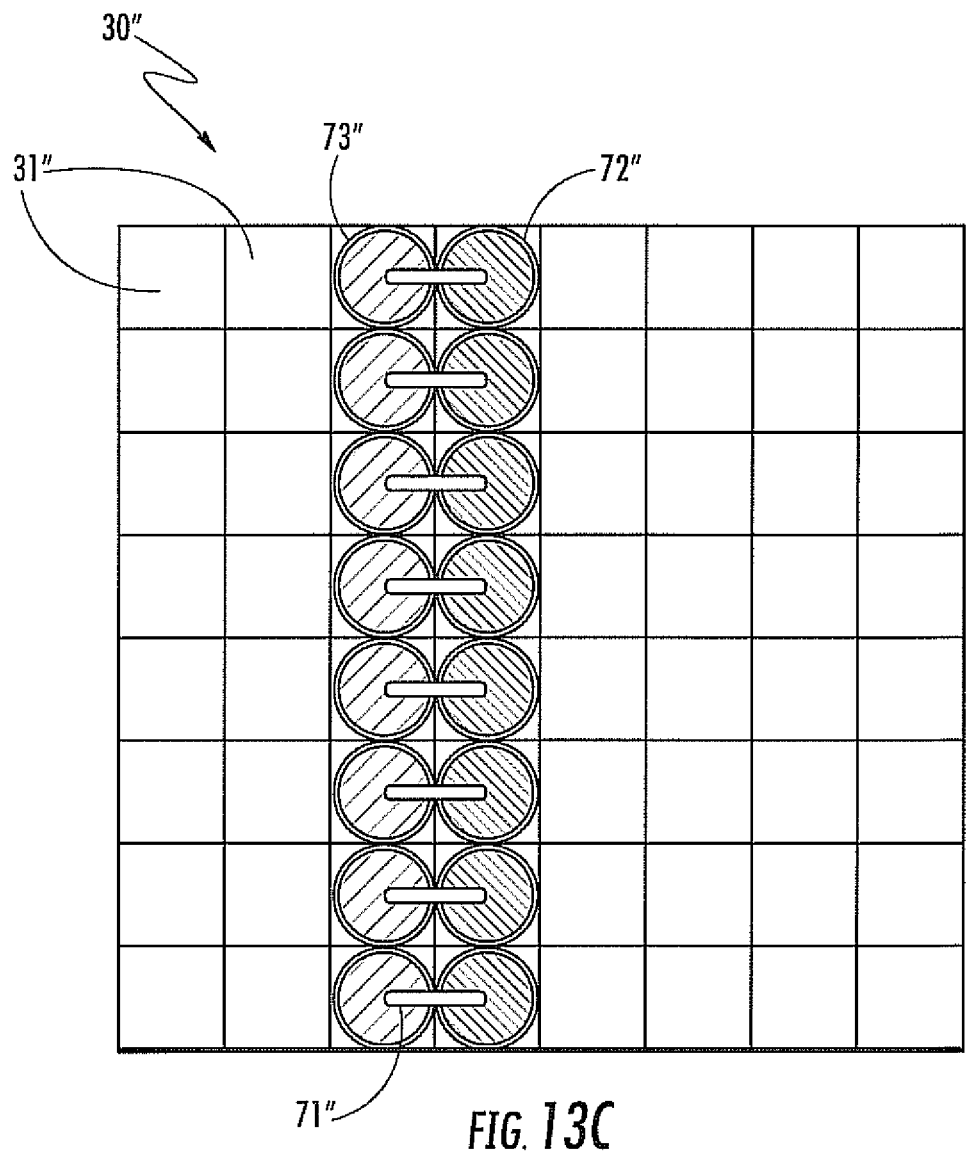
Figure 13D:
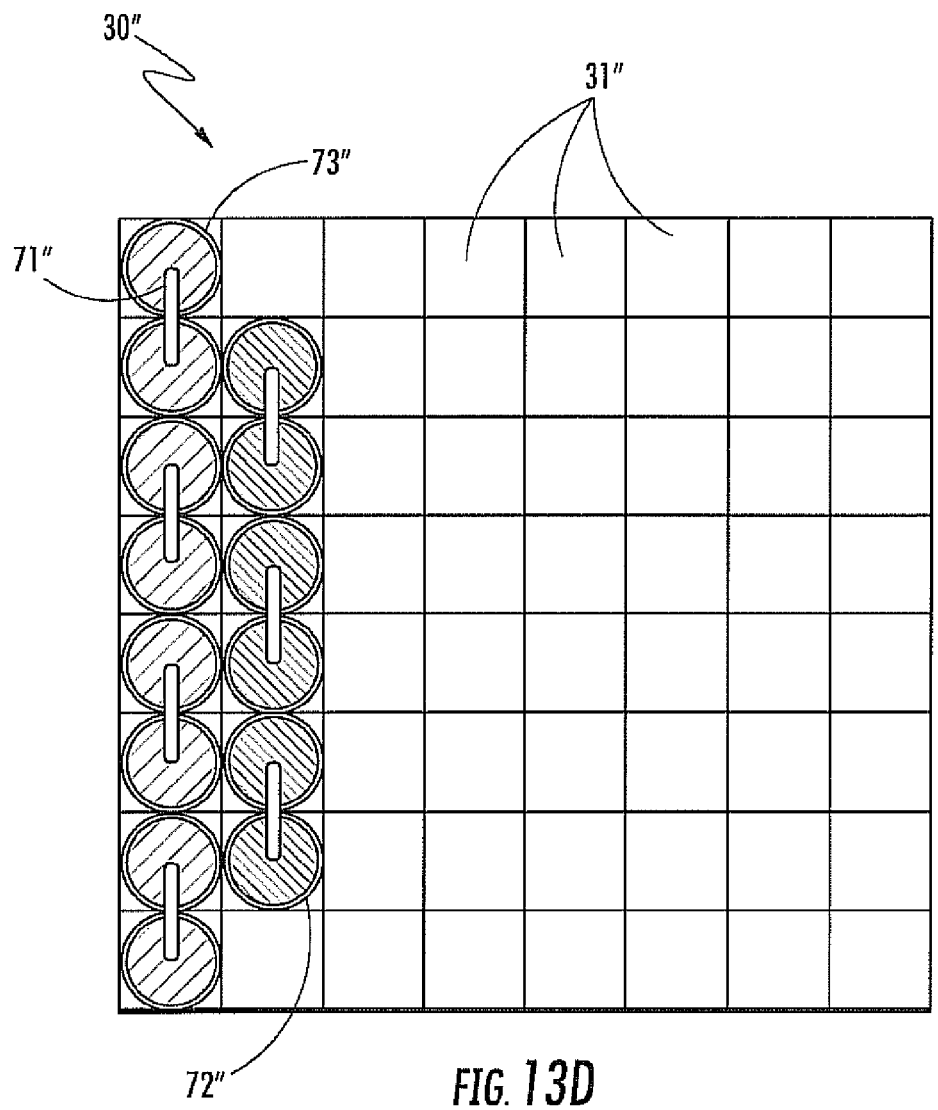
Figure 13E:
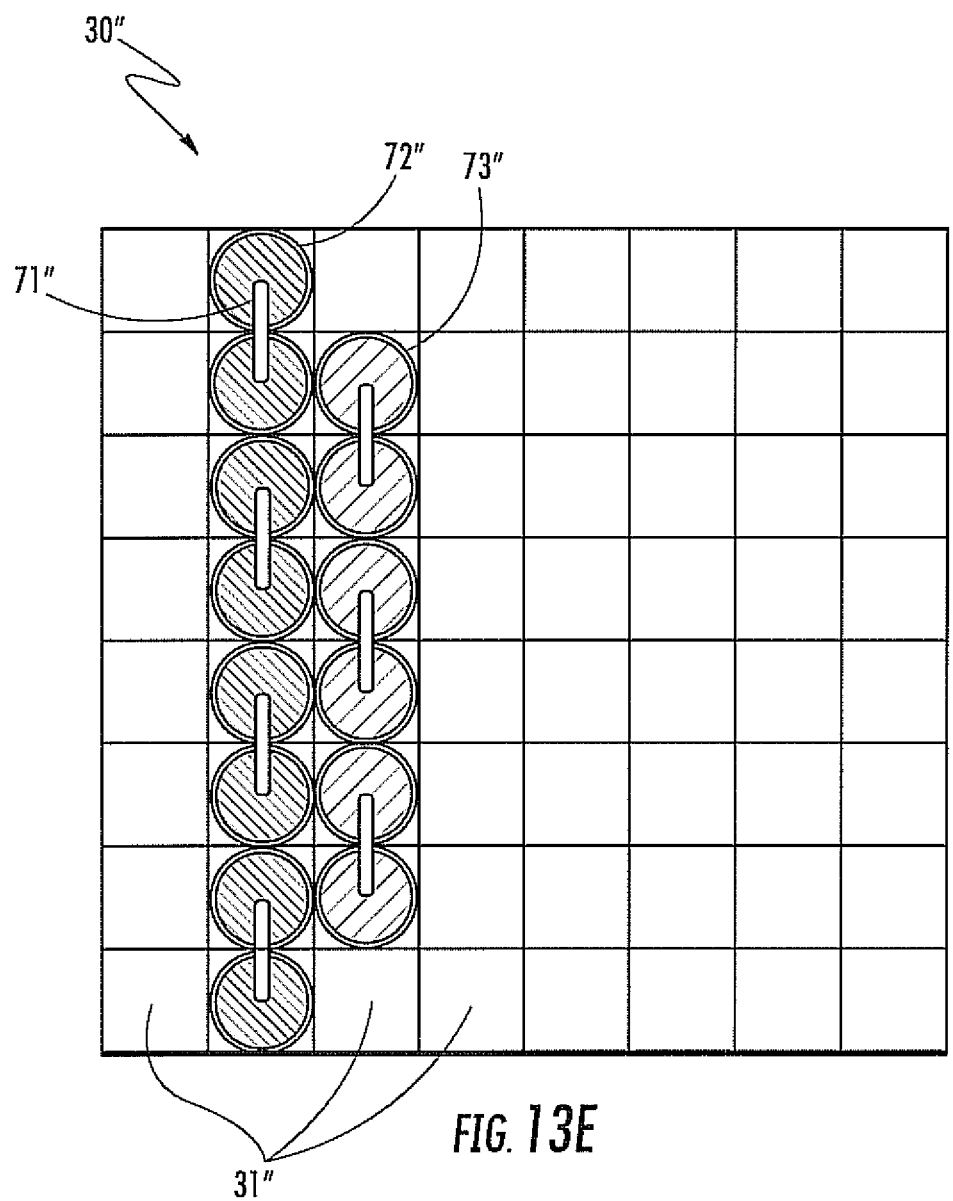
Figure 13F:
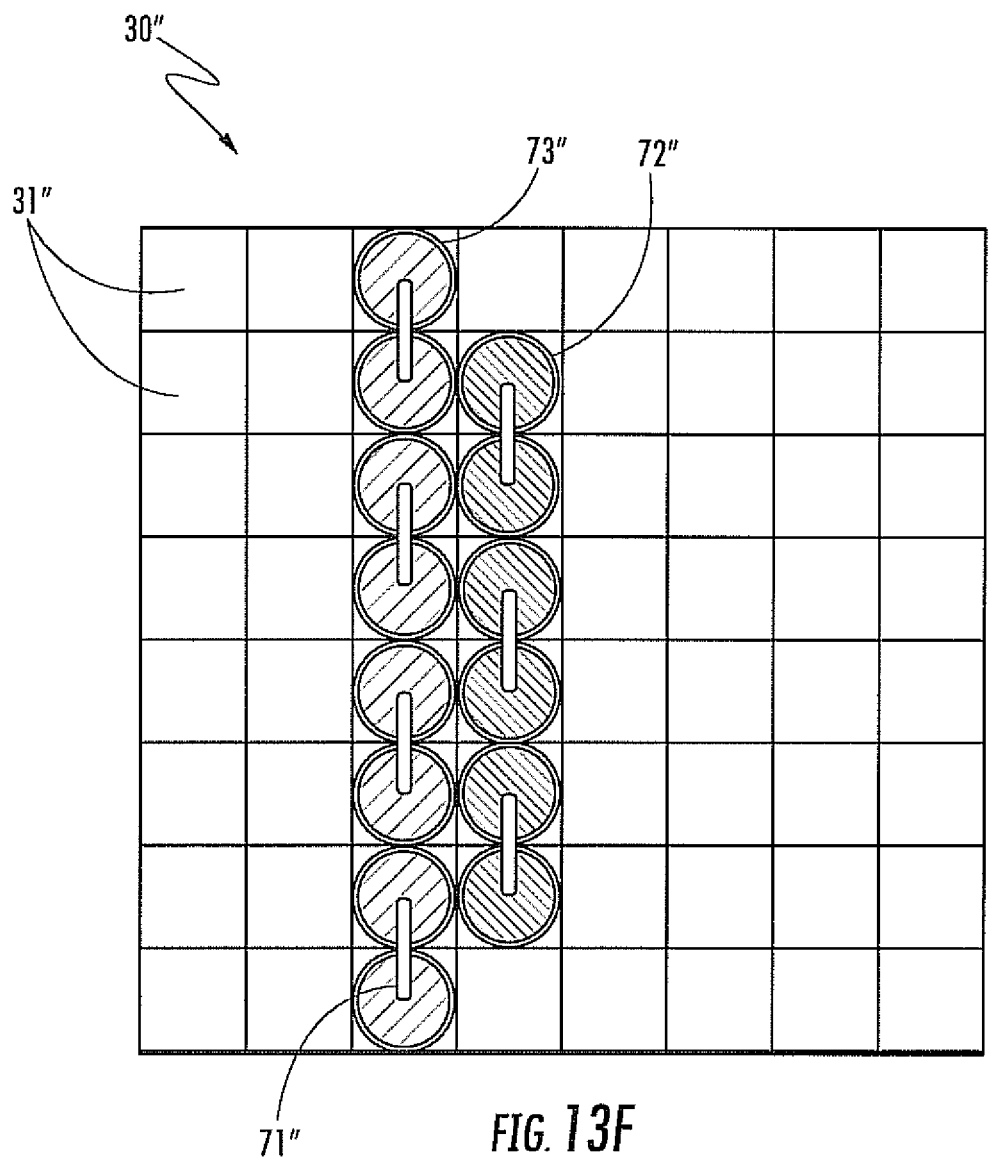

Referring now to FIGS. 11 and 12, in another embodiment for very high impedance signals, such as, for example, those generated by electric field sensing pixels, a split differential amplifier design is used where each finger sensing pixel 31" includes one side of a balanced differential transistor pair defining a differential amplifier stage 42". Switching circuitry 43" interconnects these transistors to operate as differential pairs in different configurations at different times, to make different inter-pixel measurements. In other words, the differential pixel measurement circuitry 40" is balanced.

The respective differential amplifier stage 42" is coupled to each finger sensing electrode 32" of each finger sensing pixel 31". Each differential amplifier stage 42" is illustratively in the form of an analog transistor, for example.

The switching circuitry 43" selectively couples respective pairs of differential amplifier stages 42" in a differential configuration for the adjacent pairs of the finger sensing pixels 31". As noted above, adjacent pixels 31" may be pixels that are spaced by any of 0 to 6 pixels intervening for a typical 500 pixel-per-inch sensor and to image typical ridges and valley, for example.

The switching circuitry 43" includes two pixel busses 44a", 44b", and a bank of bus switches 45" for each row that allows the busses to be switched into the various configurations needed to interconnect the finger sensing pixels 31" in the row into the differential transistor stages 41". The switching circuitry 43" also illustratively includes respective analog switches in the form of an analog switching transistor 46" coupled to each finger sensing pixel 31". The alternating connection of the finger sensing pixels 31" to the two sets of busses 44a", 44b" allows two adjacent pixels 31" in the same row to be connected together as a balanced differential pair, as will be appreciated by those skilled in the art. An output stage 48", which is illustratively in the form of a differential amplifier, is coupled to the switching circuitry 43". The measured signal, i.e. measured interpixel difference measurement, is output from the output stage 48"

While only two finger sensing pixels 31" are illustrated, it should be understood that additional finger sensing pixels in a row may be added, and several rows of finger sensing pixels may also be included. Each row of finger sensing pixels would have their associated busses, switch banks and amplifiers, as will be appreciated by those skilled in the art.

Image generating circuitry 51" is coupled to the differential measurement circuitry 40", and more particularly, may be coupled to the output stage 48". The image generating circuitry may be configured to generate a composite finger image based upon the interpixel measurements for adjacent pairs of the finger sensing pixels 31" along both the rows and columns of the array of finger sensing pixels 30". Respective output stages 48" representing each row of pixels may be integrated, for example, to generate the composite finger image. Other composite finger image generation techniques may be used, as will be appreciated by those skilled in the art.

Referring now to FIGS. 13a-13f, a scanning sequence for use with a finger sensing device to sequentially read all of the differential pixel voltages across the array of finger sensing pixels 30" according to an embodiment of the present invention is illustrated. The array of finger sensing pixels is illustratively an 8×8 array of finger sensing pixels. This scan sequence assumes that there are 8 row amplifier/switch bank structures of the type discussed above, one associated with each row of pixels. It further assumes that these amplifiers can operate in parallel, so that up to eight differential pixel measurements can be performed simultaneously during each scan step. Each of FIGS. 13a-13f represents a scan step, and illustrates which finger sensing pixels in the array are differentially connected and being measured. The black lines 71" interconnecting the darker and lighter dots 72", 73" indicate pixels that are connected together into differential pairs, and the darker and lighter dots are each coupled to a respective bus. Of course, other sequences can be used that can include varying degrees of measurement redundancy and which may as a result have enhanced noise reduction benefits.

Additionally, the bussing and switching arrangements described above are examples of a wide range of different bussing and switching configurations that may be used to interconnect the finger sensing pixels into the differential amplifier configurations. For example, a double bus beneath the finger sensing pixels that interconnects the pixels' analog switches to the column current sink may be reduced to a single bus with a reduced complexity switching bank, at the cost of less flexibility in the scanning sequences that can be supported, as will be appreciated by those skilled in the art.

In many cases, the differential pixel measurement data can be used in its raw form directly (or with only minor modifications/enhancements) without actually reconstructing the shape of the user's finger. Referring again to FIGS. 10a-10c, the edges of the fingerprint ridges are clearly present in the image representation of the pixel difference data. Often this information is quite usable in that form. For example, in a finger sensing device where the array of finger sensing pixels is mechanically moving across the user's finger, the differential pixel data from several frames of the data stream may be used to estimate the movement of the user's finger object with respect to the array of finger sensing pixels. The correlation estimation methods typically used for this task can make effective use of the edge information contained in the differential pixel data. In a second example, some types of finger sensing devices rely on extracting and matching the regional orientation of the ridge pattern.

Figure 14A:
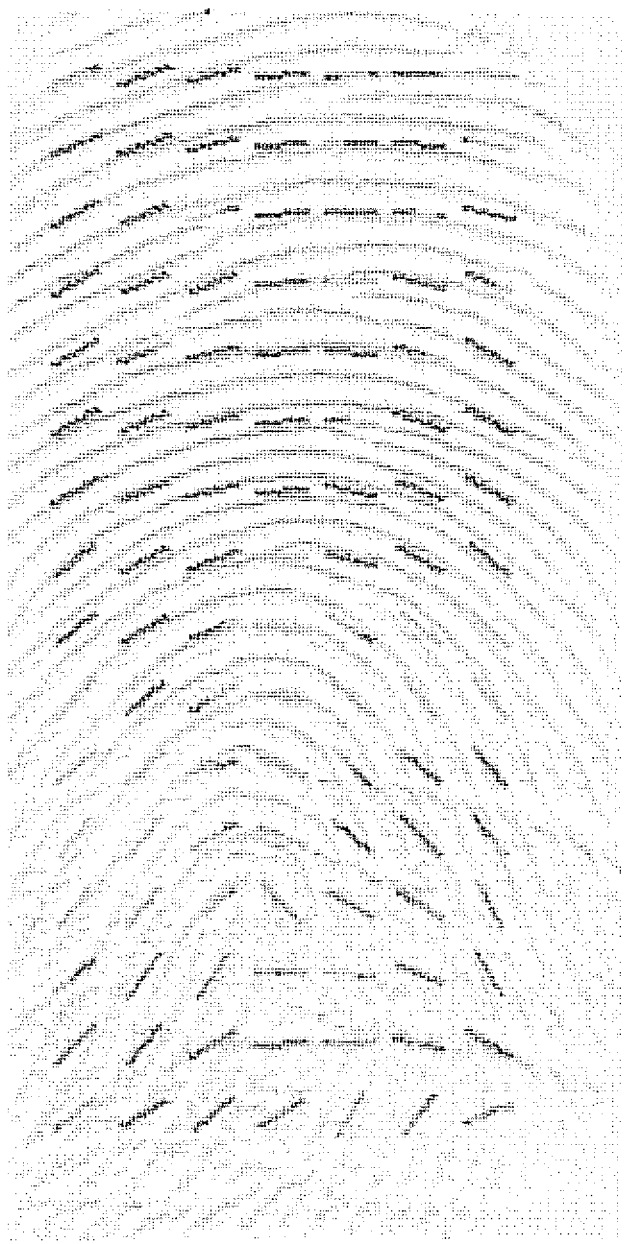
FIGS. 14a and 14b are greatly enlarged fingerprint images including ridge orientation vectors extracted from vertical and horizontal pixel differences, respectively.
Figure 14B:
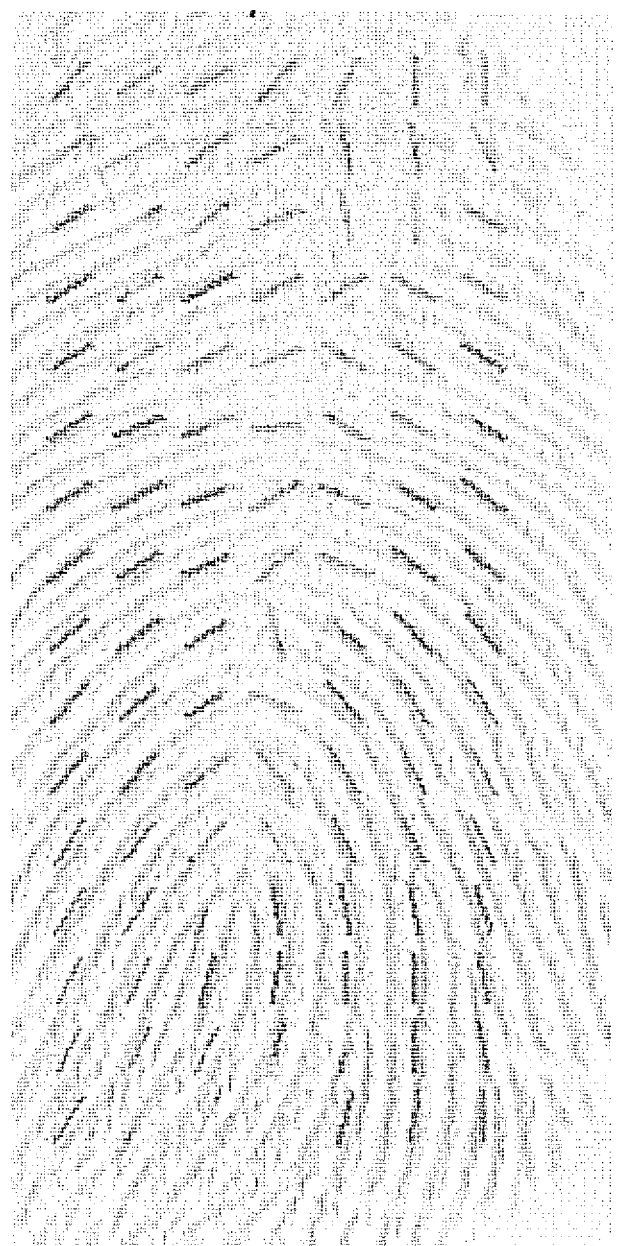

Referring now additionally to FIGS. 14a and 14b, the ridge orientation vector field of a fingerprint can, in this example case, be readily extracted directly from the differential pixel measurements. The confidence level of each of the ridge direction vectors is indicated by the intensity of the vector, with darker vectors being a highest confidence level and lighter vectors being a lowest confidence. By combining the orientation data extracted from the vertical and horizontal pixel differences can produce a complete high-confidence ridge orientation map.

Many practical implementations of remote shape sensing may not use all of the spatial frequency components of that shape to be reproduced. In many finger sensing devices that perform pattern recognition, the pattern of interest may be included in information within a limited spatial frequency band. Spatial frequencies outside that band, both above and below, may constitute noise to the pattern recognition system and are typically removed by filtering or other means. For example in fingerprint pattern matching, information having spatial frequencies significantly lower or significantly higher than the friction ridge frequency hinders recognition. In these applications the shape image collection system can be simplified by removing the undesired information early in the process and not carrying that information through the system.

Figure 15:
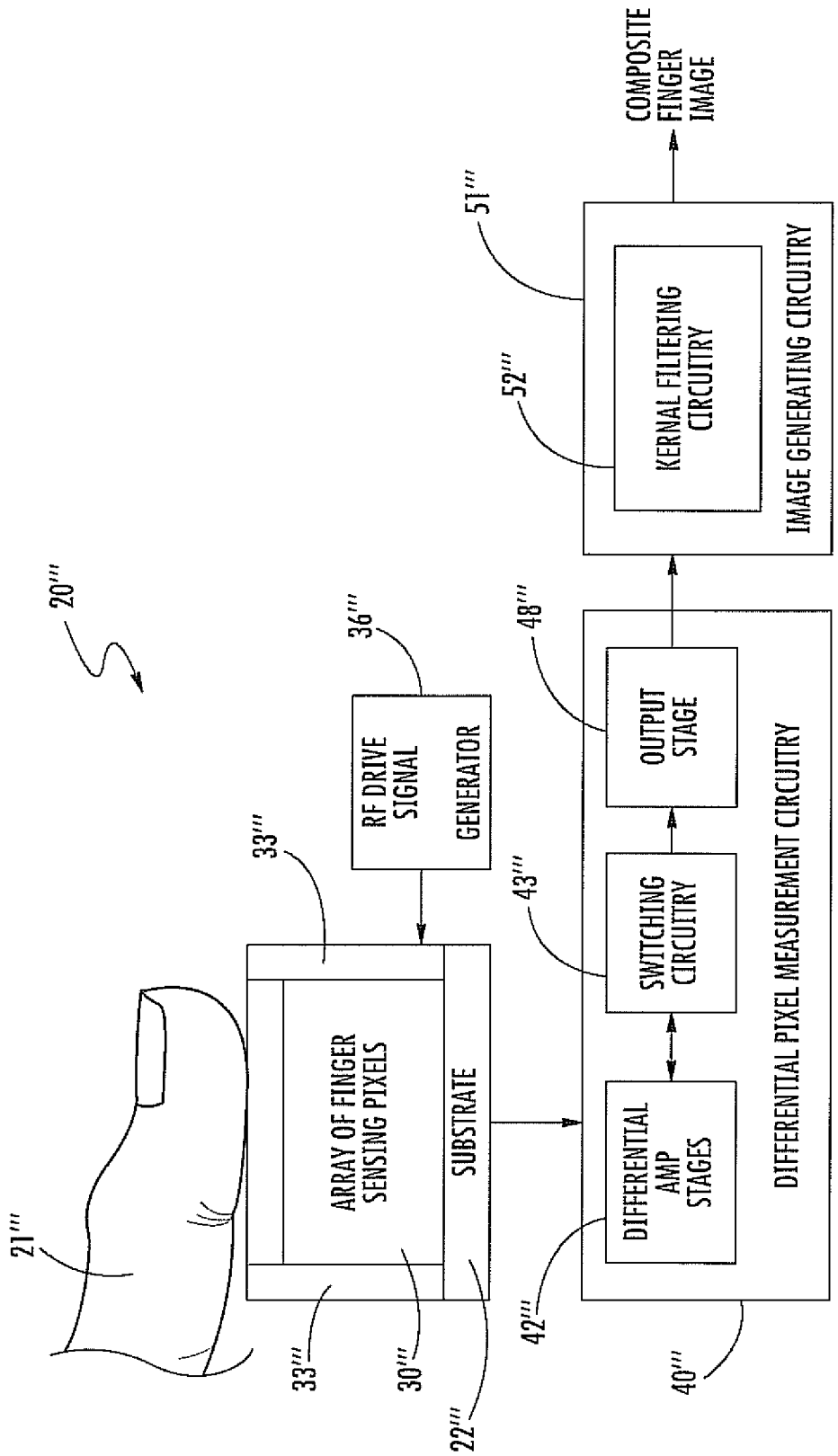
FIG. 15 is a schematic block diagram of a finger sensing device according to another embodiment.
Figure 16:
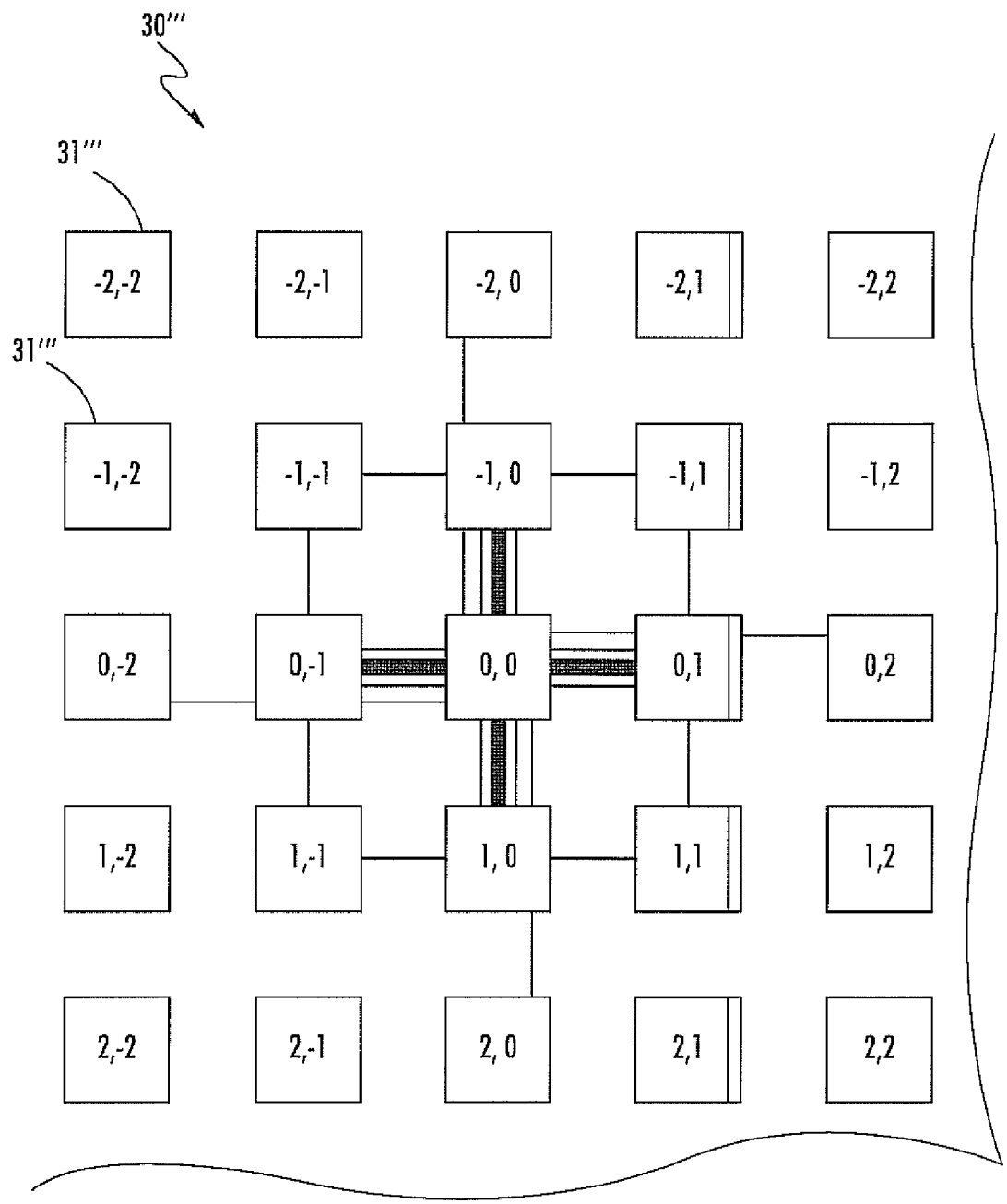
FIG. 16 is a schematic diagram illustrating kernel based reconstruction according to the embodiment in FIG. 15.

Referring now to FIGS. 15 and 16, in reconstructing shape information from differential pixel measurements, low spatial frequencies may be removed from the output image by restricting the region of pixel differences that are integrated to contribute to the value of each output pixel to a small kernel. Spatial wavelengths that are significantly larger than the kernel size may have little effect on the output of the kernel integration. One way to look at kernel integration is to consider averaging the values derived by following several paths through various pixel difference measurements to the pixel whose output value is being value calculated.

This technique representing the kernel based reconstructing process is schematically represented in FIG. 16. The image generating circuitry 51''' includes kernel processing circuitry 52''' which is configured to compute the value of each finger sensing pixel 31''' from the difference measurements made in the vicinity to a given finger sensing pixel. In particular:

Pixel Value=$\Sigma[W_1 \cdot \Delta \text{oneStepPath}_{(i1)}]+$
$[W_2 \cdot \Delta \text{oneStepPath}_{(i2)}]+\ldots$ The array of weights $W_n$ constitutes a filtering kernel that can impart spatial frequency response tailoring to the finger sensing device. Thus, the array of finger sensing pixels 31''' can be more or less sensitive to different spatial frequencies.

Since each finger sensing pixel's value is computed from multiple partially-redundant measurements made using different finger sensing pixel transistors at different times, both fixed pattern noise and temporal noise can be reduced. The two-dimensional properties of the array of finger sensing pixels 30''' enhance this effect by providing more measurement redundancy.

Using this type of image reconstruction, the finger sensing device 20''' behaves like a spatial highpass filter in the sense that spatial DC signals, (e.g., uniform offsets in the array signals) typically do not affect the measurements. If the array of finger sensing pixels 30''' is moving across a larger image, for example, and capturing frames as it moves, spatial frequencies with wavelengths smaller than the size of the array of finger sensing pixels may not be present in the reconstructed image unless special consideration is taken when reconstructing the image across frame boundaries, as will be appreciated by those skilled in the art.

The shape reconstruction process may also be structured to compensate for the spatial frequency specific attenuation that occurs in remote measurements using diffusive fields. Referring again to FIG. 5 for the simulation data showing spatial frequency sensitive attenuation, it may be desirable to produce an output image that accurately represents the original user's finger by balancing the different spatial frequency components. One way to accomplish this is to design the integration method used for reconstruction to re-emphasize the spatial frequencies that have been more strongly attenuated in the remote field propagation process. The approach illustrated in FIG. 16 includes one representation of spatial frequency compensation in the reconstruction process.

An alternate representation of the shape reconstruction process may be implemented. In the alternate representation, the adaptation of classic spatial filtering convolution kernels provides a spatial frequency tailored reconstruction of the user's finger information. More particularly, a weighting matrix that generates the spatial frequency compensation can be based upon the distance from the pixel being calculated.

The sign of the contribution from each delta pixel measurement contributing to the pixel being calculated generally depends on the signs of the polarity of the differential measurements. For the horizontal deltas, measurements to the left of the pixel being calculated are accumulated with the opposite sign from those on the right. For the vertical deltas, measurements above the pixel being calculated will be accumulated with the opposite sign from those below.

The kernel for the image construction operation can be the horizontal and vertical spatial frequency weighting matrix, with the signs modified to reflect the left/right and up/down criterion.

For each pixel in the output image:

Pixel Value=$\Sigma(Kh_{i,j} \cdot \Delta h i,j)+\Sigma(Kv_{i,j} \cdot \Delta v_{i,j})$ Where:
Kh is the horizontal image construction kernel;
Kv is the vertical image construction kernel;
$\Delta h$ is the matrix of horizontal deltas;
$\Delta v$ is the matrix of vertical deltas; and
i and j represent the size of the kernel around the pixel being computed.

Increased efficiency implementations of spatial frequency tailored kernel reconstruction may be achieved in some circumstances by using fast Fourier-transform style mathematics to minimize redundant partial results calculations, as will be appreciated by those skilled in the art.

By using multiple paths to calculate the shape of the original user's finger 21''' (or the alternate implementation in spatial filter representation) the effects of noise in the individual difference measurements may be reduced. Both linear and non-linear filtering can be used depending on the characteristics of the noise signals to be suppressed.

Referring back to FIGS. 14a and 14b, the orientation of strongly linear patterns such as, for example, fingerprints, may be calculated directly from the delta pixel information. That orientation information, along with the pattern's spatial frequency information which may also be derived from the difference measurements, can be used to orient the kernel filtering circuitry 52''' as an asymmetric-kernel shape reconstruction filter. Such a filter can provide significant noise cancellation and image quality improvements for patterns with strongly oriented textures.

As will be appreciated by those skilled in the art, the finger sensing device 20 advantageously reads fingerprints from a user's finger positioned at a larger distance away from the array of finger sensing pixels 30. This allows a number of different mechanical packaging and host device integration approaches that may mitigate the disadvantages of specialized packaging and problems with mechanical integration.

Figure 17:
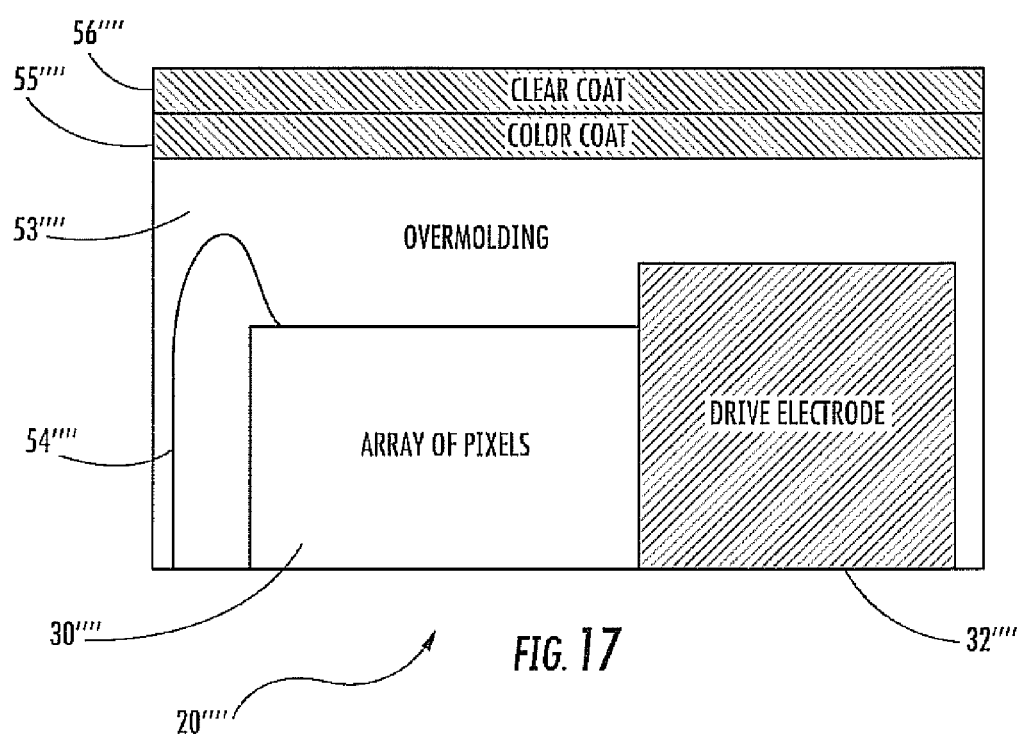
FIG. 17 is a schematic diagram of an overmolded package arrangement including the finger sensing device of an embodiment of the present invention.

Referring now additionally to FIG. 17, in the IC packaging domain these approaches may include overmolded IC packages, which are a relatively low cost, high yield packaging of fingerprint sensing ICs that use standard molded packages that do not have an opening over the array of finger sensing pixels. Illustratively, the finger sensing device 20'''' includes an overmolding 53'''' over the array of finger sensing pixels 30'''', the finger drive electrode 32'''', and a bond wire 54''''. A color coat layer 55'''' is over the overmolding 53'''', and a surface clear coat layer 56'''' is over the color coat layer. The thickness of the overmolding 53'''' and clear and color coat layers 55'''', 56'''' may be in a range of 100-900 microns, for example. This may reduce the need for special thin coatings that are currently used over the array of finger sensing pixels, replacing it with the standard mold compound. It may also reduce special manufacturing and handling equipment and practices associated with these sensors.

Figure 18:
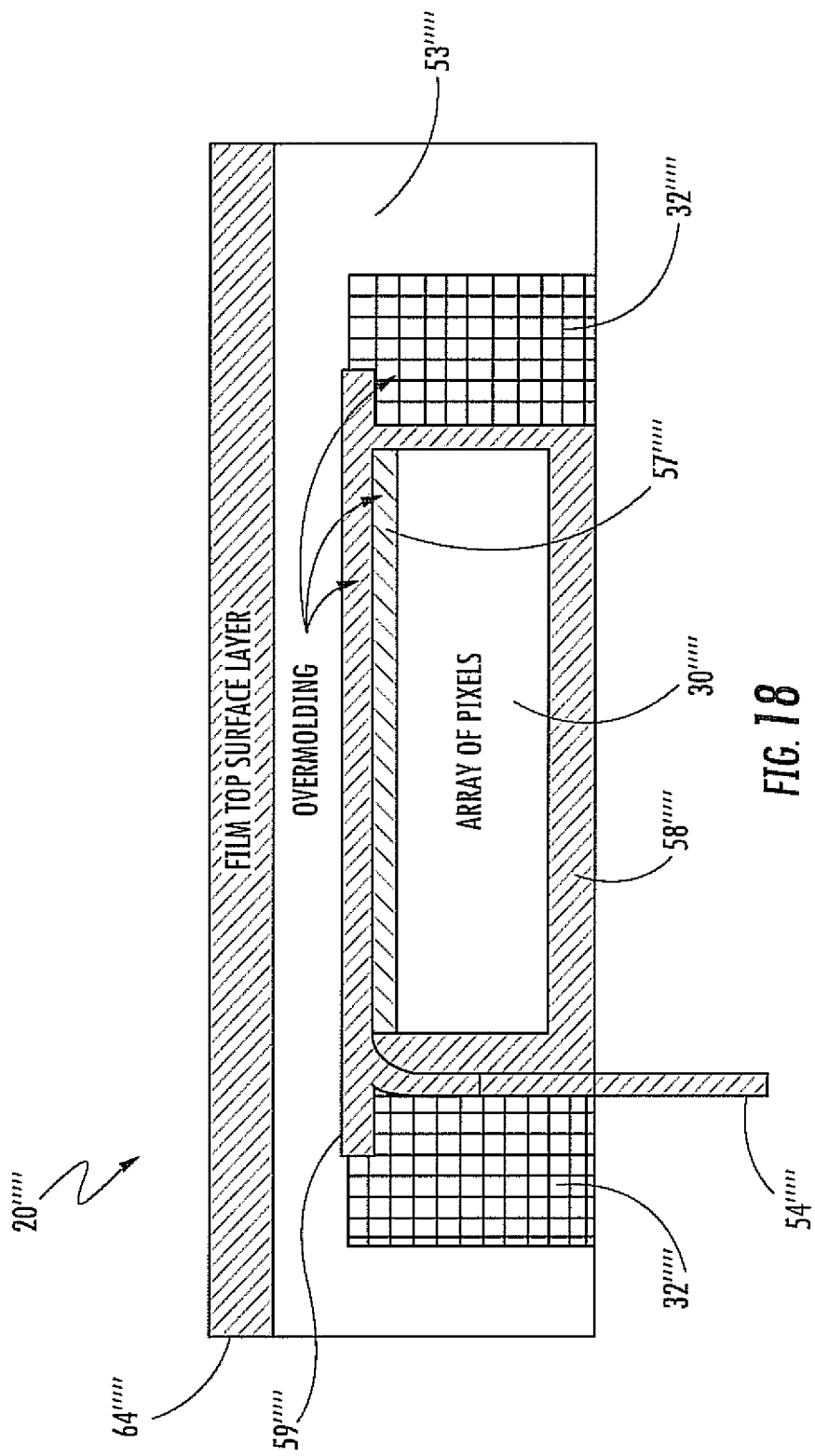
FIG. 18 is a schematic diagram of a standard pushbutton package arrangement including the finger sensing device of an embodiment of the present invention.

Referring now additionally to FIG. 18, another approach involves directly molding the finger sensing device 20'''' directly into standard pushbuttons, for example. Illustratively, a flip chip underfill 57'''' is carried by the array of finger sensing pixels 30'''', and a backfill 58'''' surrounds the sides and underneath of the array of finger sensing pixels 30''''. A bond wire 54'''' couples through the backfill 58''''. An interconnection substrate 59'''', for example, a Kapton substrate, is over the flip chip underfill 57'''' and partially over the finger drive electrode 32''''. Overmolding is carried above the interconnection substrate 59'''' along the length of the finger sensing device 20''''. A film top surface layer 64'''' is carried by the overmolding 53''''. A finger sensing device 20'''' that can work with standard thicknesses of plastic material molded over them may be molded as an integral part of a molded key cap, something that is relatively difficult with current sensors.

Still further, the finger sensing device 20 described herein may be embedded into standard laminated identification (ID) cards. A finger sensing device that can image the user's finger through standard laminations used in smartcard and RF-ID card fabrication may now be economically built into those cards, using standard low cost card assembly processes.

Yet another approach involves mounting the finger sensing device 20 underneath the case or housing of the host device with no penetration to the outside of the case. The finger sensing device 20 reads the fingerprint through the case plastic. Table 1 below indicates total imaging distances for a finger sensing device positioned underneath different housings or external structures of host devices.

TABLE 1

Total imaging distances, for fingerprint imaging from underneath device external structures all distances shown in microns

| | | | Total imaging thickness | | | | | |
|---|---|---|---|---|---|---|---|---|
| | Structure thickness | | wire bond BGA | | COF | | thru Si via BGA | |
| Structure name | min | max | min | max | min | max | min | max |
| Cellphone case thicknesses | 400 | 800 | 625 | 1025 | 475 | 875 | 440 | 840 |
| Image through thinned area in the case of a cellphone - no surface hole | 125 | 250 | 350 | 475 | 200 | 325 | 165 | 290 |
| Image through a cellphone keyboard membrane | 125 | 175 | 350 | 400 | 200 | 250 | 165 | 215 |
| Image through an LCD display cover plate | 350 | 700 | 575 | 925 | 425 | 775 | 390 | 740 |
| Image through a touchpad membrane | 125 | 300 | 350 | 525 | 200 | 375 | 165 | 340 |
| Image through a molded key cap | 75 | 150 | 300 | 375 | 150 | 225 | 115 | 190 |
| Image through smart card structural film (PET) | 75 | 125 | 300 | 350 | 150 | 200 | 115 | 165 |

A method aspect is directed to a method of sensing a finger. The method may include receiving a user's finger adjacent an array of finger sensing pixels, each finger sensing pixel comprising a finger sensing electrode. The method also includes coupling a drive signal through the user's finger to the array of finger sensing pixels via a finger drive electrode. The method also includes generating a plurality of interpixel difference measurements for adjacent pairs of the finger sensing pixels using differential pixel measurement circuitry coupled to the array of finger sensing pixels.

As will be appreciated by those skilled in the art, the circuitry described herein may include all hardware, or a combination of hardware and software or computer-executable instructions that are executed on a processor. In some embodiments, more than one processor may be used, and the processing may be shared across the processors, for example, with a host processor. Other processing and hardware/software configurations may be used, as will be appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A finger sensing device comprising:
   an array of finger sensing pixels to receive a user's finger adjacent thereto, each finger sensing pixel comprising a finger sensing electrode;
   a finger drive electrode configured to cooperate with said array of finger sensing pixels to couple a drive signal through the user's finger; and
   differential pixel measurement circuitry coupled to said array of finger sensing pixels and configured to generate a plurality of interpixel difference measurements for adjacent pairs of said finger sensing pixels.

2. The finger sensing device of claim 1, further comprising a cover layer over said finger sensing pixels having a thickness in a range of 100-900 microns.

3. The finger sensing device of claim 1, wherein said differential pixel measurement circuitry comprises balanced differential pixel measurement circuitry.

4. The finger sensing device of claim 3, wherein said balanced differential pixel measurement circuitry comprises:
   a respective differential amplifier stage coupled to each finger sensing electrode of each finger sensing pixel;
   switching circuitry to selectively couple respective pairs of differential amplifier stages in a differential configuration for the adjacent pairs of said finger sensing pixels; and
   an output stage coupled to said switching circuitry.

5. The finger sensing device of claim 1, wherein said array of finger sensing pixels comprises rows and columns of finger sensing pixels; and wherein said differential pixel measurement circuitry comprises switching circuitry for generating the plurality of interpixel measurements for adjacent pairs of said finger sensing pixels along both rows and columns of said array of finger sensing pixels.

6. The finger sensing device of claim 5, further comprising image generating circuitry coupled to said differential measurement circuitry and configured to generate a composite finger image based upon the interpixel measurements for adjacent pairs of said finger sensing pixels along both rows and columns of said array of finger sensing pixels.

7. The finger sensing device of claim 6, wherein said image generating circuitry comprises kernel filtering circuitry coupled to said differential measurement circuitry.

8. The finger sensing device of claim 1, further comprising a semiconductor substrate; and wherein said array of finger sensing pixels are on said semiconductor substrate.

9. The finger sensing device of claim 1, further comprising a radio frequency drive signal generator coupled to said finger drive electrode.

10. A finger sensing device comprising:
an array of finger sensing pixels to receive a user's finger adjacent thereto, each finger sensing pixel comprising a finger sensing electrode;
a finger drive electrode configured to cooperate with said array of finger sensing pixels to couple a drive signal through the user's finger;
balanced differential pixel measurement circuitry coupled to said array of finger sensing pixels and configured to generate a plurality of interpixel difference measurements for adjacent pairs of said finger sensing pixels; and
a cover layer over said finger sensing pixels having a thickness in a range of 100-900 microns.

11. The finger sensing device of claim 10, wherein said balanced differential pixel measurement circuitry comprises:
a respective differential amplifier stage coupled to each finger sensing electrode of each finger sensing pixel;
switching circuitry to selectively couple respective pairs of differential amplifier stages in a differential configuration for the adjacent pairs of said finger sensing pixels; and
an output stage coupled to said switching circuitry.

12. The finger sensing device of claim 10, wherein said array of finger sensing pixels comprises rows and columns of finger sensing pixels; and wherein said balanced differential pixel measurement circuitry comprises switching circuitry for generating the plurality of interpixel measurements for adjacent pairs of said finger sensing pixels along both rows and columns of said array of finger sensing pixels.

13. The finger sensing device of claim 12, further comprising image generating circuitry coupled to said balanced differential pixel measurement circuitry and configured to generate a composite finger image based upon the interpixel measurements for adjacent pairs of said finger sensing pixels along both rows and columns of said array of finger sensing pixels.

14. The finger sensing device of claim 13, wherein said image generating circuitry comprises kernel filtering circuitry coupled to said balanced differential pixel measurement circuitry.

15. The finger sensing device of claim 10, further comprising a semiconductor substrate; and wherein said array of finger sensing pixels are on said semiconductor substrate.

16. The finger sensing device of claim 10, further comprising a radio frequency drive signal generator coupled to said finger drive electrode.

17. A method of sensing a finger comprising:
receiving a user's finger adjacent an array of finger sensing pixels, each finger sensing pixel comprising a finger sensing electrode;
cooperating with the array of finger sensing pixels to couple a drive signal through the user's finger to the via a finger drive electrode; and
generating a plurality of interpixel difference measurements for adjacent pairs of the finger sensing pixels using differential pixel measurement circuitry coupled to the array of finger sensing pixels.

18. The method of claim 17, further comprising a cover layer over the finger sensing pixels having a thickness in a range of 100-900 microns.

19. The method sensing device of claim 17, wherein the differential pixel measurement circuitry comprises balanced differential pixel measurement circuitry.

20. The method of claim 19, wherein the balanced differential pixel measurement circuitry comprises:
a respective differential amplifier stage coupled to each finger sensing electrode of each finger sensing pixel;
switching circuitry to selectively couple respective pairs of differential amplifier stages in a differential configuration for the adjacent pairs of the finger sensing pixels; and
an output stage coupled to the switching circuitry.

21. The method of claim 17, wherein the array of finger sensing pixels comprises rows and columns of finger sensing pixels; wherein the differential pixel measurement circuitry comprises switching circuitry; and wherein the plurality of interpixel measurements are generated for adjacent pairs of the finger sensing pixels along both rows and columns of the array of finger sensing pixels using the switching circuitry.

22. The method of claim 21, further comprising generating a composite finger image based upon the interpixel measurements for adjacent pairs of the finger sensing pixels along both rows and columns of the array of finger sensing pixels via image generating circuitry coupled to the differential measurement circuitry.

23. The method of claim 22, wherein the composite finger image is generated via kernel filtering circuitry coupled to the differential measurement circuitry.

\* \* \* \* \*

UNITED STATES PATENT AND TRADEMARK OFFICE
CERTIFICATE OF CORRECTION

PATENT NO.       : 8,888,004 B2
APPLICATION NO.  : 13/269316
DATED            : November 18, 2014
INVENTOR(S)      : Setlak et al.

It is certified that error appears in the above-identified patent and that said Letters Patent is hereby corrected as shown below:

In the Claims

Column 18, Line 17    Delete: "finger to the via"
                      Insert: --finger via--

Column 18, Line 26    Delete: "method sensing device of"
                      Insert: --method of--

Signed and Sealed this
Twenty-fourth Day of February, 2015

Michelle K. Lee
*Deputy Director of the United States Patent and Trademark Office*